(12) United States Patent
Weidenbach et al.

(10) Patent No.: US 11,647,685 B2
(45) Date of Patent: *May 16, 2023

(54) IMPLEMENT POSITION CONTROL SYSTEM AND METHOD FOR SAME

(71) Applicant: Raven Industries, Inc., Sioux Falls, SD (US)

(72) Inventors: Alex Weidenbach, Sioux Falls, SD (US); John D. Preheim, Beresford, SD (US)

(73) Assignee: Raven Industries, Inc., Sioux Falls, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 18/046,443

(22) Filed: Oct. 13, 2022

(65) Prior Publication Data

US 2023/0059149 A1 Feb. 23, 2023

Related U.S. Application Data

(63) Continuation of application No. 17/084,044, filed on Oct. 29, 2020, now Pat. No. 11,470,756, which is a
(Continued)

(51) Int. Cl.
*A01B 63/24* (2006.01)
*A01C 23/04* (2006.01)
*A01G 25/09* (2006.01)

(52) U.S. Cl.
CPC ............ *A01B 63/24* (2013.01); *A01C 23/047* (2013.01); *A01G 25/09* (2013.01)

(58) Field of Classification Search
CPC ... A01B 63/24; A01B 69/001; A01B 63/1112; A01C 23/047; A01G 25/09; A01D 41/141; A01M 7/0057; A01M 7/0089
See application file for complete search history.

(56) References Cited

U.S. PATENT DOCUMENTS 5,337,959 A * 8/1994 Boyd .................. A01M 7/0089
239/69
5,348,226 A * 9/1994 Heiniger ............. A01M 7/0057
239/164
(Continued)

FOREIGN PATENT DOCUMENTS

EP 3653052 A1 5/2020
WO WO-2020014689 A1 1/2020

OTHER PUBLICATIONS

"U.S. Appl. No. 16/510,828, Notice of Allowance dated Jul. 22, 2020", 11 pgs.
(Continued)

*Primary Examiner* — Mussa A Shaawat
(74) *Attorney, Agent, or Firm* — Schwegman Lundberg & Woessner, P.A.

(57) ABSTRACT

An automated implement control system includes one or more distance sensors configured for coupling with an agricultural implement. The one or more distance sensors are configured to measure a ground distance and a canopy distance from the one or more sensors to the ground and crop canopy, respectively. An implement control module is in communication with the one or more distance sensors. The implement control module controls movement of the agricultural implement. The implement control module includes a confidence module configured to determine a ground confidence value based on the measured ground distance and a canopy confidence value based on the measured canopy distance. A target selection module of the implement control module is configured to select one of the measured ground or canopy distances as a control basis for controlling movement of the agricultural implement based on the comparison of confidence values.

23 Claims, 19 Drawing Sheets

Related U.S. Application Data continuation of application No. 16/510,828, filed on Jul. 12, 2019, now Pat. No. 10,842,067.

(60) Provisional application No. 62/697,195, filed on Jul. 12, 2018.

(56) References Cited

U.S. PATENT DOCUMENTS

| | | | |
|---|---|---|---|
| 5,810,095 A | 9/1998 | Orbach et al. | |
| 6,236,924 B1* | 5/2001 | Motz | G06Q 30/02 |
| | | | 342/359 |
| 8,843,283 B2 | 9/2014 | Strelioff et al. | |
| 8,942,893 B2 | 1/2015 | Rosa et al. | |
| 9,615,501 B2* | 4/2017 | Pickett | A01B 69/004 |
| 10,255,670 B1* | 4/2019 | Wu | H04N 7/183 |
| 10,842,067 B2 | 11/2020 | Weidenbach et al. | |
| 11,510,404 B2* | 11/2022 | Redden | G05B 13/042 |
| 2009/0326763 A1 | 12/2009 | Rekow | |
| 2010/0179734 A1 | 7/2010 | Schumann et al. | |
| 2010/0287900 A1 | 11/2010 | Ringwald et al. | |
| 2011/0266365 A1* | 11/2011 | Hrnicek | A01C 23/008 |
| | | | 239/164 |
| 2012/0212353 A1* | 8/2012 | Fung | B60W 10/18 |
| | | | 701/1 |
| 2013/0282200 A1 | 10/2013 | Anderson | |
| 2013/0345937 A1 | 12/2013 | Strelioff et al. | |
| 2015/0305226 A1 | 10/2015 | Zemenchik | |
| 2015/0305239 A1 | 10/2015 | Jung | |
| 2015/0367358 A1* | 12/2015 | Funseth | A01G 25/16 |
| | | | 239/562 |
| 2016/0044862 A1 | 2/2016 | Kocer et al. | |
| 2016/0136671 A1* | 5/2016 | Kocer | A01M 7/0089 |
| | | | 700/283 |
| 2016/0255778 A1* | 9/2016 | Redden | A01M 21/04 |
| 2016/0368011 A1* | 12/2016 | Feldhaus | B05B 12/124 |
| 2017/0013777 A1 | 1/2017 | Posselius et al. | |
| 2017/0202144 A1 | 7/2017 | Schlipf et al. | |
| 2017/0238456 A1 | 8/2017 | Boulard | |
| 2017/0351790 A1* | 12/2017 | Farah | G06Q 50/02 |
| 2017/0359941 A1 | 12/2017 | Czapka et al. | |
| 2018/0054983 A1* | 3/2018 | Hanna | B05B 1/20 |
| 2018/0077851 A1 | 3/2018 | Hatton | |
| 2018/0121467 A1 | 5/2018 | Derscheid | |
| 2018/0271015 A1* | 9/2018 | Redden | G06N 3/045 |
| 2019/0059351 A1* | 2/2019 | Brooks | A01M 7/0089 |
| 2019/0126308 A1* | 5/2019 | Hendrickson | B05B 1/20 |
| 2019/0329782 A1* | 10/2019 | Shalev-Shwartz | B60W 50/10 |
| 2020/0029484 A1 | 1/2020 | Weidenbach et al. | |
| 2020/0029485 A1 | 1/2020 | Glennon et al. | |
| 2020/0045953 A1 | 2/2020 | Serrat et al. | |
| 2021/0037694 A1 | 2/2021 | Weidenbach et al. | |

OTHER PUBLICATIONS

"U.S. Appl. No. 17/084,044, Non Final Office Action dated Mar. 3, 2022", 6 pgs.

"U.S. Appl. No. 17/084,044, Notice of Allowability dated Jul. 20, 2022", 2 pgs.

"U.S. Appl. No. 17/084,044, Notice of Allowability dated Aug. 15, 2022", 2 pgs.

"U.S. Appl. No. 17/084,044, Notice of Allowance dated Jun. 14, 2022", 5 pgs.

"U.S. Appl. No. 17/084,044, Preliminary Amendment filed Feb. 22, 2021", 9 pgs.

"U.S. Appl. No. 17/084,044, Response filed Jun. 3, 2022 to Non Final Office Action dated Mar. 3, 2022", 10 pgs.

"Canadian Application Serial No. 3,105,825, Office Action dated Mar. 2, 2022", 3 pgs.

"Canadian Application Serial No. 3,105,825, Response filed Jun. 27, 2022 to Office Action dated Mar. 2, 2022", 231 pgs.

"International Application Serial No. PCT/US2019/041729, International Preliminary Report on Patentability dated Jan. 21, 2021", 8 pgs.

"International Application Serial No. PCT/US2019/041729, International Search Report dated Oct. 4, 2019", 2 pgs.

"International Application Serial No. PCT/US2019/041729, Written Opinion dated Oct. 4, 2019", 6 pgs.

U.S. Appl. No. 16/510,828 U.S. Pat. No. 10,842,067, filed Jul. 12, 2019, Implement Position Control System and Method for Same.

U.S. Appl. No. 17/084,044 U.S. Pat. No. 11,470,756, filed Oct. 29, 2020, Implement Position Control System and Method for Same.

* cited by examiner

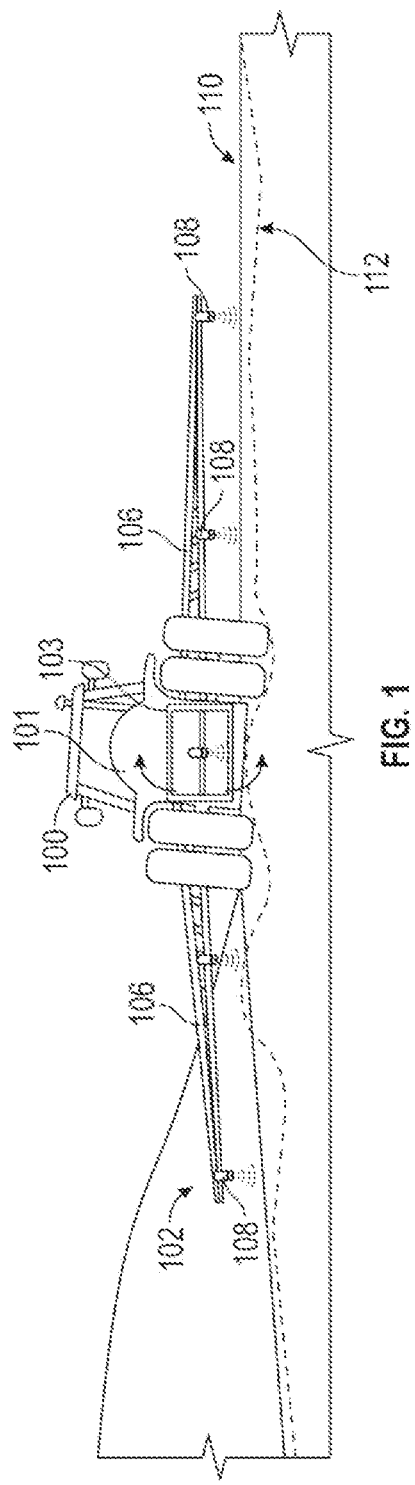
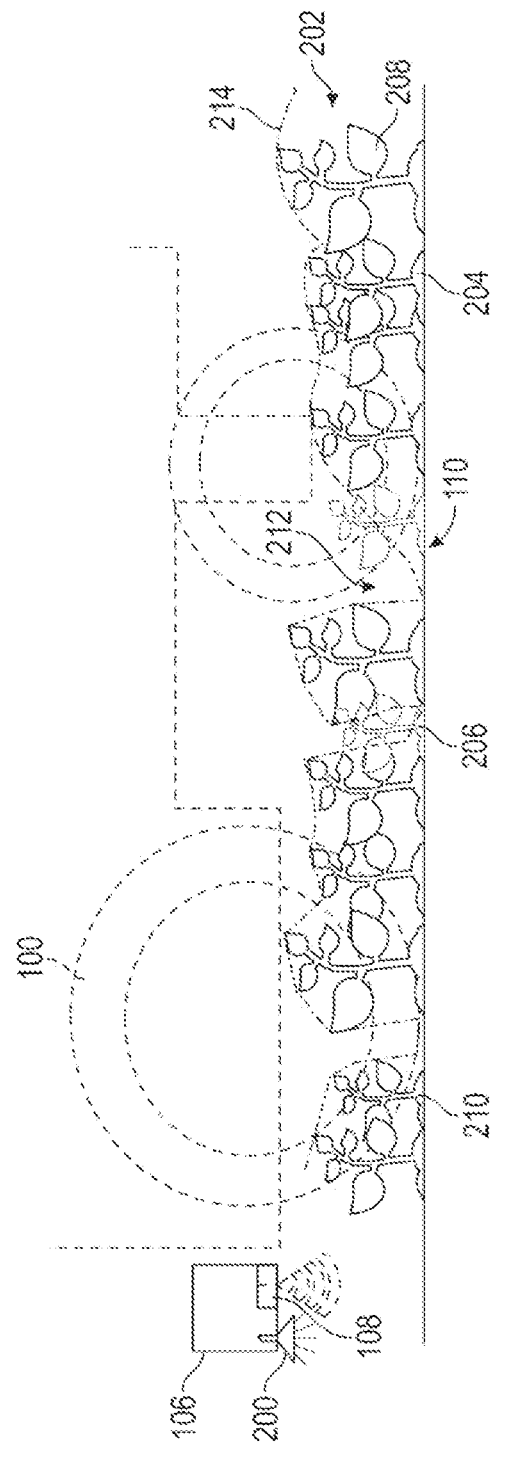

IMPLEMENT POSITION CONTROL SYSTEM AND METHOD FOR SAME

RELATED APPLICATIONS

This application is a continuation of U.S. Patent Application Ser. No. 17,084,044, filed Jul. 12, 2018, which is a continuation of U.S. patent application Ser. No. 16/510,828, filed. Jul. 12, 2019, which claims the benefit of priority to U.S. Provisional Patent Application Ser. No. 62/697,195, filed Jul. 12, 2018, which applications are incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

This document pertains generally, but not by way of limitation, to control of agricultural implements.

BACKGROUND

Agricultural vehicles include one or more implements configured to interact with features in a field including the ground (e.g., soil), crops, grass, hay, brush or the like. Implements, such as harvester heads, sprayer booms and nozzles, planter disks, seed tubes, balers or the like are positioned a specified distance relative to one or more of these features. For instance, harvester heads are positioned in proximity to the ground to ensure harvesting of the specified portion of the crop (e.g., stalk, ears, grain or the like) while at the same time sufficiently elevated to avoid a collision with the ground. In other examples, a sprayer boom, including one or more spray nozzles, is positioned a specified distance from the crop to apply one or more agricultural products in a specified manner (e.g., according to manufacturer prescription for the product).

In some examples, the implement is controlled based on input from one or more sensors, such as ultrasound sensors. For instance, a sprayer vehicle includes one or more sensors configured to measure the distance from the sensors to the ground. The height of the crop is subtracted from the measured distance to the ground as is the specified distance for application of the agricultural product (e.g., an atomized fertilizer, herbicide, water or the like). The sprayer boom and one or more nozzles are correspondingly raised or lowered to apply the agricultural product based on the distance remaining after the calculation.

In other examples, the implement includes one or more sensors, such as ultrasound sensors, configured to measure the distance from the sensors to the crop, such as the leafy canopy of the crop. In a sprayer vehicle, the sprayer boom is raised or lowered to position the sprayer boom and one or more nozzles at the specified distance for application of the agricultural product.

OVERVIEW

The present inventors have recognized, among other things, that a problem to be solved includes automatically controlling the position of an implement for an agricultural vehicle in response to variations in one or more features, including, but not limited to, crop height or uneven terrain while at the same time compensating for inconsistent and sometimes unreliable measurements. For instance, a sprayer vehicle includes one or more sensors configured to measure the distance to the ground from the sensor. Ground measurements are, in some examples, inconsistent. Terrain varies in elevation and angle, ground is obscured by the crop (e.g., corn leaves, stalks, grain, grass, weeds or the like), and reliable measurements of distance from the sensor to the ground are accordingly difficult. In other examples, the one or more sensors measure the distance from the sensor to portions of the crop, such as the canopy of the crop (e.g., leaves). Depending on spacing between each plant the distance measured varies significantly as the sensors alternate between measuring a distance to the canopy and immediately transitioning to measuring the intervening (exposed) ground having a distance significantly different relative to the distance to the canopy. In other examples, the crop is dry and is poorly detected by the sensors.

In automated systems including these sensors the sprayer boom may, in some examples, incorrectly raise and lower based on these unreliable sensor measurements. The incorrectly positioned sprayer boom and nozzles may apply the agricultural product below the canopy (thereby decreasing its efficacy), collide with the ground or crop (causing damage to one or more of the crop or the sprayer boom) or the like. Alternatively, the sprayer boom attempts to compensate for the fluctuating inaccurate measurements and rocks upwardly and downwardly in an attempt to follow the measurements, applies the product in a less than ideal manner, and in some examples the sprayer boom, actuators or the like are damaged by the rocking movement.

The present subject matter helps provide a solution to this problem, such as by an automated implement control system that measures multiple distances, assesses the measured distances and selects at least one of the measured multiple distances to base control of the implement upon. The control system includes one or more distance sensors having ground and canopy sensing elements. An implement control module of the system determines confidence values for each of the respective ground distance and canopy distance measured with the ground and canopy sensing elements of the one or more distance sensors. A selection module selects one of the measured ground distance or measured canopy distance to serve as a control basis (e.g., a verified distance from the implement or sensor to one of the ground or the canopy), and control of the implement, such as positioning, is premised on the selected distance (ground or canopy).

The determination of the confidence values includes a comparison of one or more values based on the measured ground and canopy distances. For instance, rates of change of the ground and canopy distances (e.g., velocities, accelerations including angular versions of the same) are compared with thresholds including but not limited to static thresholds (e.g., operator set thresholds for rates of change) and dynamic thresholds based on the rates of change of the measurement assessed. In one example, a ground confidence value is determined with a comparison of the ground distance rate of change with the canopy distance rate of change.

In another example, the ground distance rate of change for measured ground distance at a first sensor is compared with a plurality of rates of change including, but not limited to, one or more of the canopy distance rate of change for measured canopy distance at the first sensor, ground distance rates of change of a plurality of sensors, canopy distance rates of change of the plurality of sensors, or one or more predicted ground distance rates of change at one or more of the plurality of sensors. In an example including a predicted ground distance rate of change, the predicted ground distance (the basis used for determining the predicted ground distance rate of change) is kinematically determined. For instance, an implement profile including one or more of implement dimensions, sensor positions and implement orientation is used to determine the predicted ground distance at the first sensor (or distances at the plurality of sensors). The rate (or rates) of change of the predicted ground distance (distances) is used as another value for comparison with the ground distance rate of change.

Comparison of the canopy distance rate of change is similarly conducted, for instance with one or more plurality of rates of change including, but not limited to, one or more of the ground distance rate of change for measured ground distance at the first sensor, canopy distance rates of change of a plurality of sensors, ground distance rates of change of the plurality of sensors, or one or more predicted ground distance rates of change at one or more of the plurality of sensors. In another example, the predicted ground distance is similarly compared (e.g., the predicted ground distance rate of change is compared with one or more of the rates of change described herein).

The comparisons provide confidence values for each of the respective measured distances indicating the reliability of the respective distances. A comparison indicating the measured or predicted distance under evaluation corresponds (e.g., the rate of change is similar) with the other distances (including one or more of the rates of changes of the other distances) receives a higher confidence value. While a compared measured or predicted distance that differs from the other distances (including their respective rates of change) receives a lower confidence value. The confidence value (e.g., a comparative confidence value) for the respective measured distance is accordingly variable based on the comparison and varies between a one and zero (corresponding to 100 percent to 0 percent confidence).

In still other examples, a kinematic model of the vehicle (e.g., agricultural implement, chassis or the like) is analyzed to generate one or more predictive windows and window shifts for the measured ground and canopy distances. The kinematic model of the vehicle includes uses one or more position measurements (distance or angle), rates of change of the same or the like to generate the predictive window and window shift. In one example, the kinematic model determines a combined angular velocity of the vehicle based on an implement angle, chassis roll rate and implement rack angle. The kinematic model generates a corresponding predicted height change for the implement (e.g., a portion of the implement) based on the combined angular velocity and one or more optional supplemental kinematic inputs. The predicted height change provides a range of values, the predictive window, and shifts the predictive window according to the total height change and one or more time constants to provide the predictive window shift. Each of the distances is compared with the predictive windows and window shifts to assess the reliability of the measured distances relative to the predicted values and assign an initial confidence value (e.g., a comparative confidence value) for the ground or canopy measurement that is compared with the opposed confidence value for the canopy or ground measurement.

The selection module selects one of the measured ground distance, measured canopy distance (and in some examples the predicted ground distance) as a control basis (e.g., a verified or confirmed distance) according to the highest comparative ground or canopy confidence value. Optionally, where the confidence values of each of the measured ground distance or canopy distance have a low confidence value (e.g., 50 percent, 40 percent, 30 percent, 25 percent or lower) the selection module selects the predicted ground distance as the agricultural implement value. In another example, the selection module includes a distance priority (e.g., ground distance is prioritized higher than the canopy distance, for instance with a confidence weight). Optionally, with low confidence values for each of the measured ground distance and measured canopy distances (e.g., below a base confidence threshold) the selection module selects the measured distance having the highest priority (e.g., the measured ground distance in an example).

The automated implement control system is thereby configured to select one or more measured distances or predicted distances (e.g., the predicted ground distance) for use as a reference value for implement control based on determination and evaluation of confidence values for the various measurements and predictions. Inconsistent measurements (e.g., unreliable, noisy, poor measurements) because of obscured or partially obscured ground, gaps in the canopy, poorly detected dry canopies or the like are accordingly disregarded in favor of measurements having higher confidence values. For instance, the automated implement control system evaluates the various measured distances (and optionally the predicted distances) described herein and selects the best (highest confidence) measurement for use in controlling the implement while disregarding, for the time being, the lower confidence measured distance. The implemental control module of the system operates in an ongoing manner and accordingly conducts the evaluation (e.g., confidence value determination, comparison of confidence values, and selection based on the confidence) automatically. If the confidence values change and indicate that another measured distance (e.g., canopy instead of ground or ground instead of canopy) has a higher confidence value the selection module accordingly hands off the control basis from the previous measured distance to the updated higher confidence measured distance.

The agricultural implement is thereafter controlled based on the higher confidence measured distance (e.g., a sprayer boom is raised, lowered or maintained based on the selected distance). For instance, ground or canopy based distance measurements selected depending on the confidence values, are used to detect deviation (e.g., canopy error or ground error) from a corresponding target distance (e.g., a specified ground target distance or specified canopy target distance associated with the selected measured ground or canopy distances), and the implement control module accordingly guides the implement toward the respective target distance. In one example, the implement control module transitions the implement toward a minimal deviation (e.g., including an error of zero) indicating the implement is positioned proximate the target distance. Implement control is thereby enhanced including, for instance, reliable positioning of a sprayer boom at a specified application distance relative to a crop canopy or ground, avoidance of collisions between the sprayer boom and the crop or ground or the like.

Further, as the automated implement control system evaluates the respective confidences of the measured distances and switches between use of the ground and canopy measured distances, the system also updates target distances, such as target distance from the implement or sensor to either of the ground or the canopy, used with implement height determinations. For instance, an example target distance from ground (a target distance from the sensor to the ground with the ground as the reference, or origin) for applying a sprayed agricultural product is 60 inches. This is the specified target distance (or height) of the implement relative to ground. In the example, this may correspond to a user estimated crop canopy height of 40 inches (from ground) and a specified application spacing of 20 inches between the sensor (and implement feature, such as a sprayer nozzle, bottom of the implement or the like) and the crop canopy, or 60 inches total. This target distance (e.g., an ideal target distance) is used with implement control having measured ground distance as the control basis.

In another example, for instance with the measured canopy distance having the higher confidence value, and accordingly selected as the control basis, the target distance from ground (e.g., 60 inches in the example) is not used without modification. Instead, a target distance from the canopy is used. In this example, the target distance from the canopy is 20 inches (e.g., a specified application spacing between the canopy and the implement, such as a sprayer boom). Accordingly, with the measured canopy distance as the agricultural implement reference the target distance is updated to a canopy target distance, such as an agricultural product application spacing of 20 inches.

In another example, the target distance includes a substitute target distance that is a variable value based on the distance form a preceding measurement before switching. For instance, as the system transitions from using measured ground distance and a user specified target ground distance to measured canopy distance the target canopy distance is in one example determined from the preceding ground measurements, the specified target ground distance and deviations relative to the target ground distance. For instance, a Canopy Target Substitute (based on preceding ground measurements and a ground target) equals a Measured Canopy Distance (Dc or distance to canopy filtered, DCF) plus the previous Distance to Ground Error (Dge or ground error). The previous Distance to Ground Error equals Target Ground Distance (e.g., a specified target distance to ground set by the operator) minus the preceding measured Distance to Ground (Dg or DGF). Accordingly, the Canopy Target Substitute is variable and based on the previously measured distance to the ground, for instance immediately before transition to use of the measured distance to the canopy. Conversely, as the system transitions from using the measured canopy distance to the measured ground distance the target ground distance (Ground Target Substitute) is determined from the preceding canopy measurements and deviations relative to the specified target canopy distance. For instance the Ground Target Substitute equals a Measured ground Distance (Dg or distance to ground filtered, DGF) plus the previous Distance to Canopy Error (Dce or canopy error). The previous Distance to Canopy Error equals the Target Canopy Distance (e.g., specified target distance to canopy) minus the previous measured Distance to canopy (Dc or DGF)). These determinations of target ground and target canopy substitutes facilitate the transition from use of one of the measured ground or canopy distance to the opposing measured canopy or ground distance, while also accounting for previously noted deviations from target values prior to the transition.

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a schematic rear view of one example of a vehicle navigating terrain with an agricultural implement.

FIG. 2 is a schematic side view of the agricultural implement of FIG. 1 and an oncoming agricultural crop.

DETAILED DESCRIPTION

Figure 3:
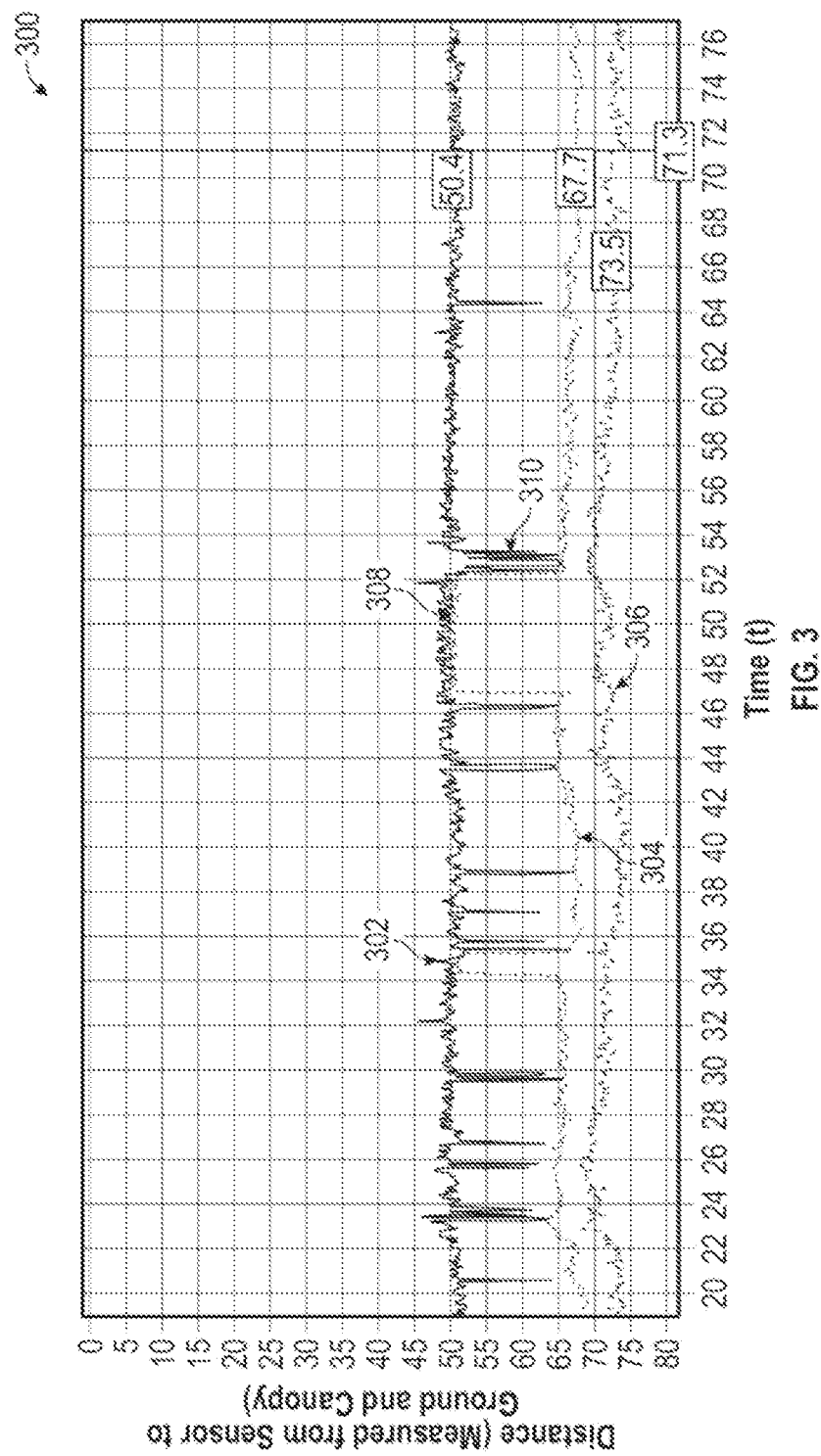
FIG. 3 is a plot of measured canopy and ground distances along with a predicted ground distance relative to an implement.

FIG. 1 is a schematic view of one example of a vehicle 100 and an associated agricultural implement 102. In this example, the agricultural implement is coupled to the chassis 101 of the vehicle 100, for instance by way of an implement rack 103 (a component of the implement 102). As further shown in FIG. 1, the agricultural implement 102 includes one or more booms 106, such as sprayer booms extending away from the vehicle 100. The booms 106 are coupled with the chassis 101, for instance with the intervening implement rack 103 (e.g., a center rack for a sprayer assembly). The booms 106 are movable relative to the chassis 101 and terrain 110 to facilitate interaction with one or more of the terrain 110 or a crop. For instance, implement actuators are coupled with the agricultural implement 102, between the booms 106 and the implement rack 103 to actuate the booms 106 into position for the application of one or more agricultural products, such as herbicides, insecticides, fertilizer, water or the like.

As described herein, examples of automated implement control systems (e.g., system 420 in FIG. 4) are described that facilitate the control of the implement position, for instance of the booms 106) to achieve an application position or specified target height relative to features, such as the ground (terrain 110) or crop canopy. The control systems described herein allow for control of the implement relative to one or more control bases, such as relative to the ground or canopy and their respective ground distance and canopy distance. Further, the control systems described herein facilitate control of the implement, including guidance toward a specified target, such as target height of the boom 106 of 60 inches (e.g., a specified target distance) relative to the ground (e.g., a specified target designation). Additionally, the systems described herein facilitate guidance of the implement 102, such as the boom 106, toward the target height (the specified target distance) even where the control basis is different from the specified target designation, for instance where the ground is not readily detectable but the crop canopy is detectable. In this scenario the system generates an alternative or substitute specified target distance based on the specified target distance to facilitate use of the different control basis for measurement, in this example the crop canopy, while still guiding the boom 106 to the specified target (e.g., 60 inches above the ground).

Referring again to FIG. 1, the agricultural implement 102 includes one or more distance sensors 108 along the boom 106 that measure the distance from the implement (e.g., the sensors) to the ground, such as the terrain 110 having the terrain contour 112 (shown in broken lines in FIG. 1). As shown in FIG. 1, the terrain contour 112 varies, in some examples, significantly. The distance sensors 108 sense the terrain contour 112 and generate a varying signal corresponding to the variations in the terrain 110 (e.g., showing changes in distance caused by the terrain variation). Additionally, the distance sensors 108 measure distance to one or more additional features, such as the crops or crop canopy between the ground (terrain 110) and the sensors 108. In some examples, as described herein, the crop canopy obscures sensing and measurement of distance to the ground and in other examples, the ground is dry and difficult to sense with the sensor 108.

FIG. 2 is a schematic side view of the vehicle 100 and the agricultural implement 102 including one of the booms 106 relative to a crop 202. As shown in FIG. 2, the boom 106 (e.g., the implement 102) includes an implement tool 200 including, but not limited to, one or more of spray nozzles, row sections of a planter, components of a harvester head, plow blades or the like. A distance sensor 108 is coupled with the implement, for instance along the boom 106. As previously described, the distance sensor 108 measures one or more distances including, for example, the distance to the ground (terrain 110) and the distance to the crop (e.g., a crop canopy, shown for instance with the dashed canopy contour line 214).

As shown in FIG. 2, the vehicle 100 is moving from left to right relative to the page. The boom 106 and the associated distance sensor 108 pass over the crop 202 having the crop canopy, in this example shown with a canopy contour line 214. As shown the crop 202 generally has a similar degree of growth among the component plants with some variations. For instance, the crop 202 includes mature and immature crops 208, 210 having corresponding heights and varying fullness of the corresponding leaves, stems or the like. Additionally, there are variations in the hydration of the crops hydrated crops 204 and dehydrated crops 206 (shown with a lighter line weight) of the crop 202. In some examples, distance sensors 108 partially sense or fail to sense dehydrated crops 206 and the dehydrated crops 206 accordingly are not sensed as part of the canopy. Further, there are crop gaps 212 between one or more of the crops corresponding to a plant that has died, failed to emerge or a gap in the row. Each of these and other variations in the crop 202 accordingly modulate the height of the crop canopy so that the crop canopy, shown with the canopy contour line 214, varies. Accordingly, each of the terrain 110 and the crop canopy (represented with the canopy contour 214) vary in their respective distances relative to the implement 102 and the distance sensors 108. In other examples, for instance with dehydrated crops 206 or crop gaps 212 measured distance to the crop canopy will merge with the measured ground distance, in effect the canopy appears to disappear based on the distance measurements. In another example, the crop canopy is sufficiently dense that the ground (terrain 110) is partially sensed or is not sensed with the distance sensors 108, and accordingly the ground appears to disappear as its distance measurements appear to merge with the measured crop canopy distances.

As described herein, the measurement of both ground (to the terrain 110 from the sensor or implement) and canopy distances (to the crop canopy from the sensor or implement) provides at least two potential bases for control of the agricultural implement position. The systems described herein, such as the agricultural implement control system 420 shown in FIG. 4 select the control basis (e.g., ground or canopy) according to a variety of characteristics indicating the reliability or confidence in the corresponding measurements. For instance, the system assesses ground and canopy distance measurements (including changes in the measurements) relative to one or more predictive windows, described herein. Ground and canopy confidence values are determined based on the assessments and used to select either of ground distance or canopy distance control as a control basis (e.g., the implement is guided relative to selected corresponding measurements or preceding measurements if the measurements are deemed unreliable). The system 420 monitors the confidence values of ground and canopy distances in an ongoing manner and hands off control of the agricultural implement position (e.g., movement of the implement 102, such as the booms 106) to either of ground distance control basis or canopy distance control basis on the assessment of confidence values, thereby ensuring the implement position is controlled according to the control basis having the greatest confidence.

FIG. 3 is a plot 300 of measured distances for each of the crop canopy and ground relative to one or more of the distance sensors 108. The distance sensor 108 in this example is positioned at the origin proximate to the top of the measured and predicted distances. As shown, the plot 300 includes the measured canopy distances (canopy distance 302) as a fluctuating line extending along the time axis and having varying distance measurements. In one example, the fluctuations correspond to variations in height of the crop (based on maturity or growth), hydration, and voids or gaps in the canopy. One example of a crop gap 212 (in FIG. 2) is shown in FIG. 3 as a canopy void 310. Alternatively, the canopy void 310 corresponds in other examples to one or more of a dehydrated crop 206, poorly reflected signal from the crop (e.g., the leaves or stem are misaligned relative to the sensor) or the like. Further, at the canopy void 310 the canopy distances appear to merge (or disappear) with the measured ground distance 304. The system 420 described herein is configured in one example to hand off control based on the canopy distance 302 (a preceding control basis) to control based on the ground distance 304 instead because of a higher confidence of the ground distance measurements while the canopy appears to disappear.

As further shown in FIG. 3, the plot 300 includes the previously described plot of ground distance measurements (ground distance 304). The measured ground distance 304 has generally greater distance measurements compared to the measured canopy distances 302 because the ground is further from the sensors and the interposed crop canopy. In a similar manner to the canopy measured canopy distances 302, the ground distance 304 includes one or more ground voids 308 that appears as a merger of the associated measured ground distances with the canopy distance 302. The ground void 308 corresponds in some examples to one or more of a portion of the ground concealed by crop canopy, poor quality of measurements, intervening obstacles or the like). As shown in the plot 300 the measured canopy distances are relatively consistent where the measured ground distances of the ground void 308 appear to disappear. In another example, the system 420 described herein hands off control based on the ground distance 304 (a preceding control basis) to control based on the canopy distance 302 because of a higher confidence of the canopy distance measurements while the ground appears to disappear. Accordingly, consistent control relative to a detectable target is maintained through switching to a higher reliability target (one of the ground or canopy distances 304, 302).

Referring again to FIG. 3, in another example a predicted ground distance 306 is plotted along with the measured canopy and ground distances 302, 304. The predicted ground distance is determined as a series of predicted heights or distances of the boom sensor 108 or the associated agricultural implement 102 (e.g., the boom 106 having the sensor). One or more kinematic characteristics of the vehicle (e.g., a prime mover, tow behind implement) and the agricultural implement are known (such as dimensions of the vehicle and implement), measured (such as implement rack angle, roll rate of the chassis, boom angle) or determined (such as rate of change of the boom angle, angular acceleration of the boom angle or the like). The kinematic characteristics are, in one example, analyzed to predict a height of the sensor 108 (or associated implement 102, such as the boom 106) relative to reference location, such as the ground, canopy or the like. In the example shown in FIG. 3 the predicted ground distance 306 corresponds to a predicted height (including a change in height in another example) of the boom 106 relative to ground at a location of the distance sensor 108 along the boom. For example, with kinematic characteristics including a boom angle measurement (e.g., boom angle 902 in FIG. 9A) of the boom 106 and the location (distance) of the distance sensor 108 along the boom 106 both the angle and hypotenuse of a corresponding triangle are known and the predicted height of the boom 106 at the sensor 108 location is readily determined (e.g., with the sin product of the angle and the hypotenuse).

Figure 10:
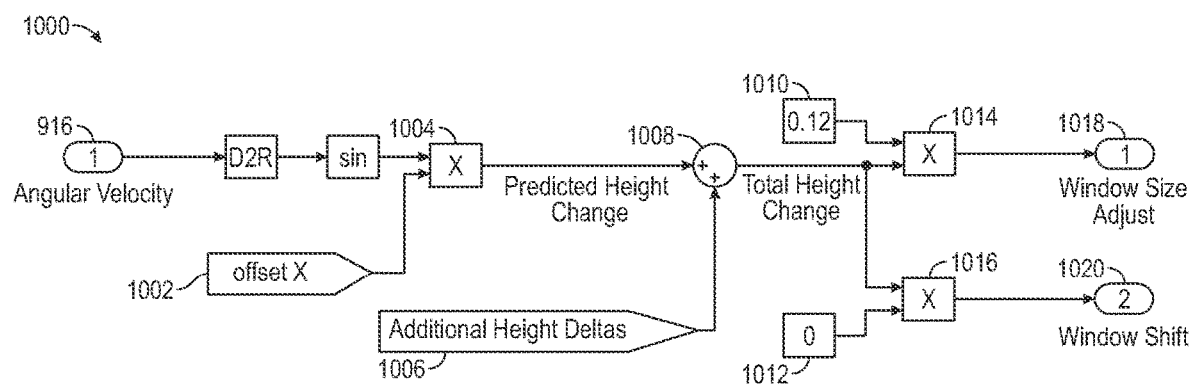
FIG. 10 is a schematic diagram of an example implement prediction module with an example predictive window output.

As described herein, the predicted ground distance 306 (or change in the predicted ground distance from a prior value) is a component for generating a predictive window 1018 including an optional predictive window shift 1020 as shown in FIG. 10. One or more of ground or canopy distance measurements (including changes in the measurements relative to a prior measurement) are compared with the predictive window to assess the reliability of the measurements for assignment of confidence values.

In another example, predicted ground distance 306 is optionally used in place of the ground or distance measurements 304, 302 for control of the implement position (e.g., operation of an actuator, such as implement actuator 406). For instance, if each of the confidence values for the ground and distance measurements 304, 302 fall below a minimum threshold value the automated implement control system 420 selects the predicted ground distance at the control basis and accordingly determines the deviation of the implement 102 (such as the boom 106) relative to difference between the predicted ground distance and a specified target distance, such as an optimal boom height relative to the ground.

Figure 4:
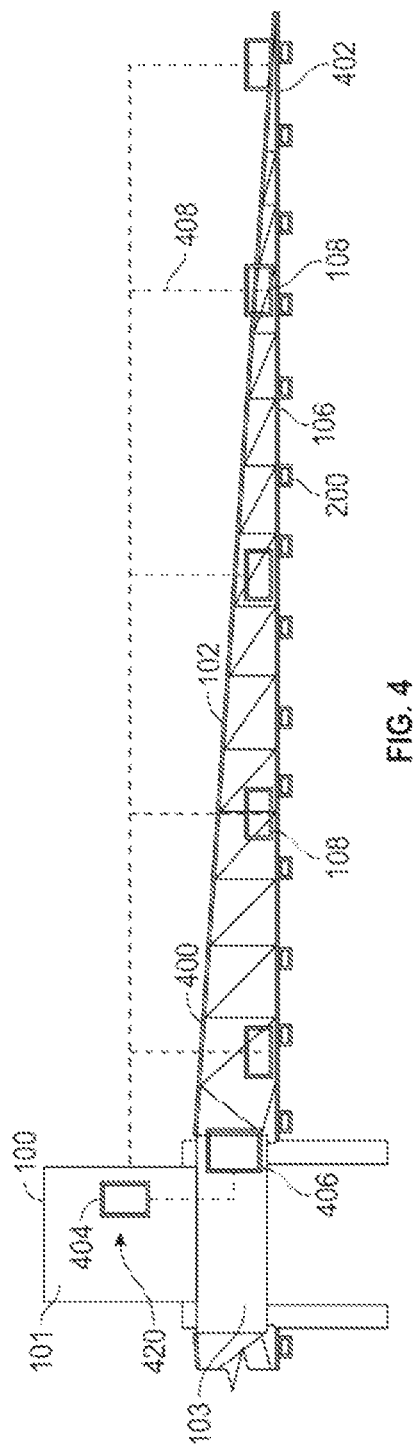
FIG. 4 is a schematic diagram of a vehicle and one example of automated implement control system.

FIG. 4 is a schematic view of the vehicle 100, such as an agricultural sprayer, tow behind sprayer, trailer or the like. The vehicle 100 includes the agricultural implement 102 having the boom 106 and the implement rack 103 coupling the boom 106 with the vehicle 100. On or more implement tools 200 are spaced along the boom 106. The implement tools 200 include, but are not limited to, sprayer nozzles, planter row assemblies, harvester rows or sections, baler intakes or the like.

As further shown, the implement, such as the boom 106 includes one or more distance sensors 108. In this example a plurality of distance sensors are at a plurality of locations along the boom 106 between an implement proximal end 400 and an implement distal end 402. Each of the distance sensors 108 is spaced from a pivot point of the boom 106 relative to the chassis 101 and, when included, the implement rack 103. The one or more distance sensors 108 are located at known distances from the pivot point of the boom 106 to facilitate the determination of boom height (e.g., distance from either or both of the canopy or ground). For example, the spacing of each of the sensors 108 is used to generate a predicted ground distance 306 as shown in FIG. 3. In another example, the spacing of each of the sensors 108 is used to generate a corresponding predictive window 1018 and window shift 1020 (collectively a predictive window) as described herein.

An implement actuator 406, such as a hydraulic cylinder, motor or the like is proximate to the pivot point, for instance with a first end of the actuator 406 coupled with the boom 106 and a second end of the actuator coupled with the implement rack 103 or the chassis 101. The implement actuator 406 controls the implement position of the agricultural implement 102, such as the boom 106. The implement actuator 406 is in communication with one or more components of the automated control system 420 shown in FIG. 4.

Referring again to FIG. 4, an example automated implement control system 420 is shown schematically relative to the vehicle 100 and the implement 102, such as the boom 106. The automated implement control system 420 in this example configuration includes an implement control module 404 in communication with the implement actuator 406 and the one or more distance sensors 108 provided on the boom 106, and optionally provided on an opposed boom 106 as another portion of the implement 102 (see FIG. 1). In the example shown in FIG. 4, an interface 408 provides one or more wireless or wired interconnections between the components of the automated implement control system 420. The interface 408 includes, but is not limited to, one or more of bus, CAN bus, blue tooth transceivers, radio frequency transceivers, hardwiring or the like.

The automated implement control system 420 measures distances with the one or more distance sensors 108 and selects a corresponding one of the measured distance types, such as ground distance or canopy distance, as a control basis. As described herein, the selection of ground or canopy distance as the control basis is conducted in an ongoing manner and the system 420 switches between each of these control types according to a confidence assessment of the respective distance measurements. Deviation of the selected ground or canopy distance as the control basis from a specified target distance (e.g., an ideal application distance relative to the canopy, boom height relative to the ground or the like) is determined with the system 420 and used for guiding the implement, such as the boom 106, toward the specified target distance.

Figure 5:
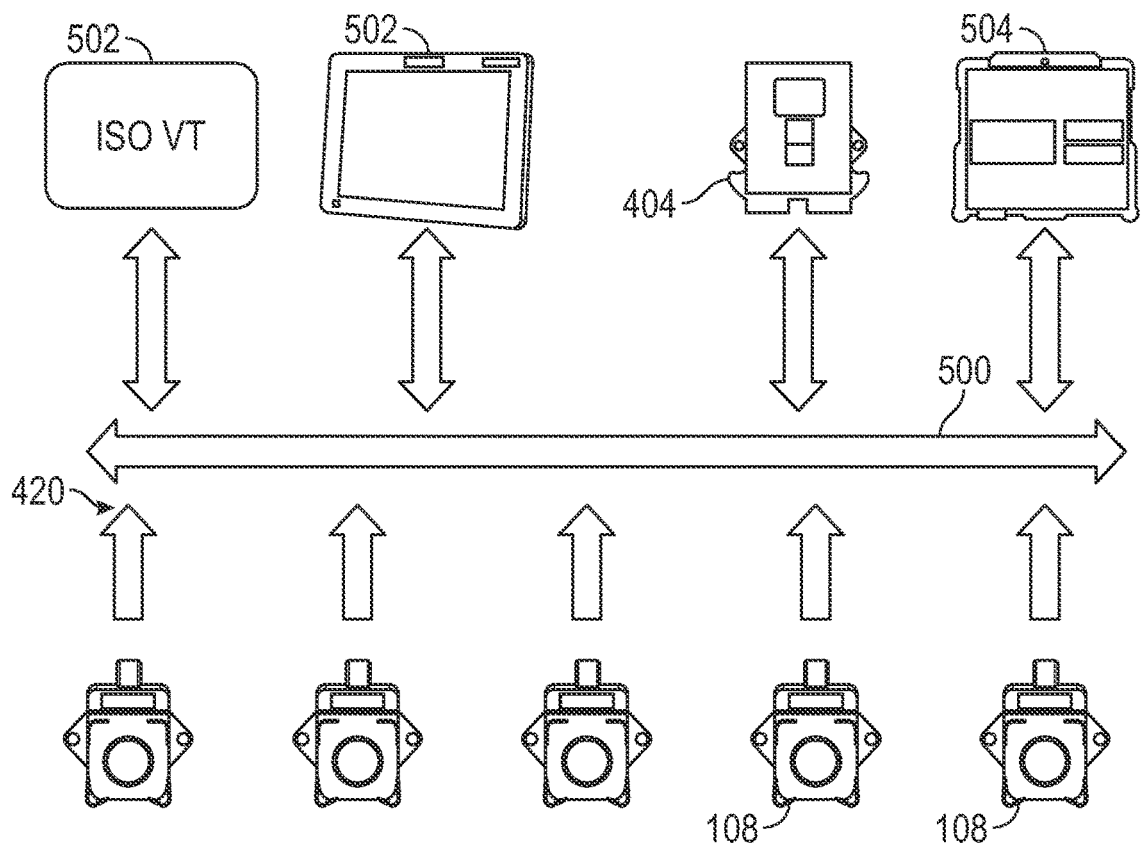
FIG. 5 is a schematic diagram of another example of an automated implement control system.

Referring now to FIG. 5, a schematic diagram of the automated implement control system 420 is shown. In this example, the interface 500 includes a CAN bus interconnecting each of the components including the implement control module 404 and the one or more distance sensors 108. As further shown in FIG. 5, one or more operator interfaces including touchscreens installed on a vehicle, field computer interfaces, remote input devices such as tablet applications, mobile phone applications or the like interconnect with the system 420. In one example, the interface 500 includes a wireless transceiver configured to receive and transmit instructions and data to the one or more operator interfaces 502.

As further shown in FIG. 5, an interface module 504 is optionally provided as a component of the automated implement control system 420. The interface module provides one or more hardware or software modules (e.g., circuits, processors, computer readable medium or the like) to facilitate an interface between one or more components of the implement 102, such as the implement actuator 406, shown in FIG. 4. For example, the interface module 504 includes, but is not limited to, signal conditioners, amplifiers or the like for the processing of control and sensor signals to and from one or more of the implement actuator 406 and distance sensors 108. In one example the interface module includes AC/DC converters, DC/AC converters, GPS interfaces or the like. In another example, the interface module 504 is optionally included as a component of the implement control module 404, and the implement control module 404 directly interfaces with one or more components, such as the implement actuator 406.

Figure 6:
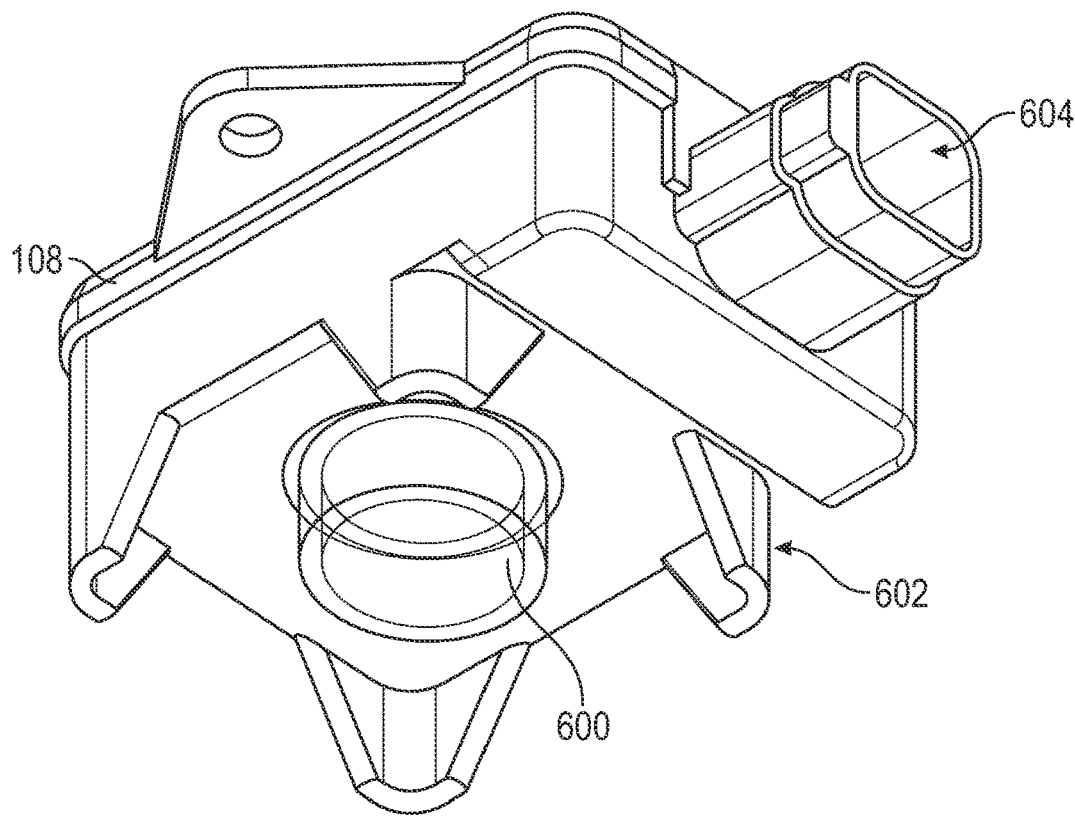
FIG. 6 is a perspective view of one example of a distance sensor.

FIG. 6 is a perspective view of an example sensor for the distance sensors 108 described herein. The distance sensor 108 includes a sensor housing 602 configured for mounting to the implement 102, for instance a boom 106 or other movable component of the implement 102. As shown in FIG. 4, a plurality of distance sensors 108 are installed along the boom 106 to accordingly sense the distance of the implement (e.g., the sensor 108 mounted to the implement) relative to one or more objects including the ground or canopy.

As shown in FIG. 6, the distance sensor 108 includes a power and data port 604 configured to interface with a power supply and one or more components of the automated implement control system 420, such as the implement control module 404. For example, the distance sensor 108 relays values corresponding to measurements and sensor confidence (described herein) to the implement control module 404 by way of wired connection at the power and data port 604 or wireless interface coupled at the power and data port 604.

The distance sensor 108 further includes a sensor emanator 600. In the example sensor 108 shown in FIG. 6, the sensor emanator 600 includes one or more sensor elements, such as radar, light, ultrasound generating elements or the like configured to generate the corresponding energy and direct the energy toward the objects of interest (e.g., ground and crop canopy). In one example, the sensor emanator 600 also includes a receiver configured to receive the reflected energy after engagement with the objects and convert the reflected energy into a signal, for instance corresponding to either of the canopy or ground distances 302, 304 shown in FIG. 3 and used at the implement control module 404. In another example, a separate receiver is proximate to the distance sensor 108 and receives the reflected energy and converts the energy into the signal.

In another example, the sensor emanator 600 includes a plurality of sensor elements each calibrated to measure one of the distance to a first object type, such as the ground (ground distance) or the distance to a second object type, such as the crop canopy (canopy distance). Optionally, the sensor emanator 600 includes sing element, such as a radar generator, configured to emit radio frequency energy that partially reflects from a first object, such as the canopy, and reflects from additional objects, such as a second object beneath the canopy, such as the ground. The reflected energy is interpreted at the sensor 108 and provides a signal indicating distance measurements to a plurality of objects, for instance shown in FIG. 3 as both of the canopy and ground distances 302, 304.

Figure 7:
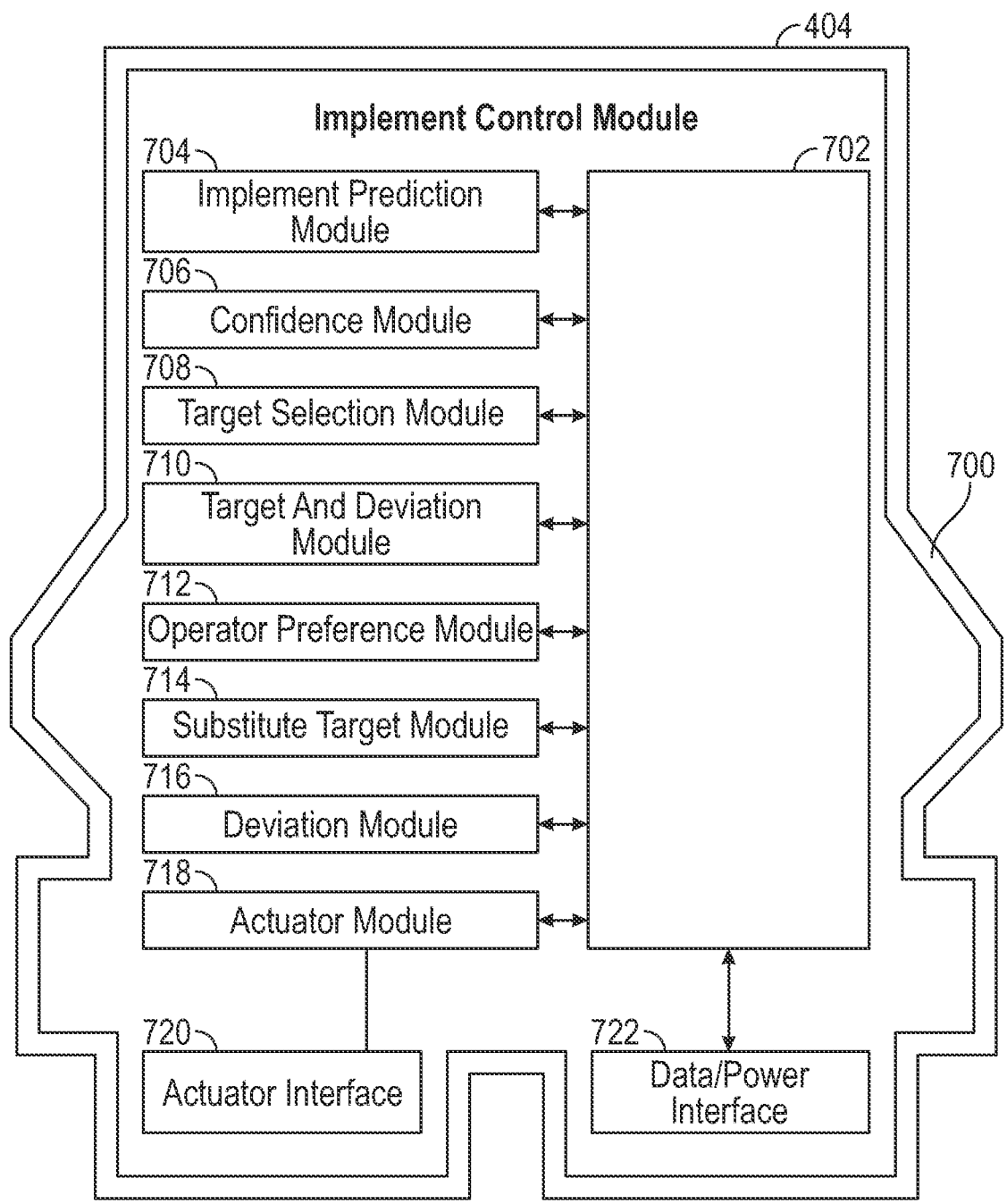
FIG. 7 is a schematic diagram of one example of an implement control module architecture for the automated implement control system.

FIG. 7 is an example schematic diagram of the implement control module 404. As shown, the implement control module includes a control housing 700 enclosing a plurality modules configured to receive the canopy and ground distances 302, 304 as signals (shown graphically in FIG. 3) assess the signals for use as a control basis for controlling the implement position, for instance of a component of an implement, such as the boom 106 shown in FIGS. 1 and 4.

The implement control module 404 includes a plurality of modules (e.g., submodules) comprising circuitry, computer readable media, software modules or the like configured to carry out the analysis described herein and implement the control basis to facilitate guidance of the implement toward a specified target distance, such as an optimal spray application range relative to the canopy, ground, plow depth, harvester head position, planting depth or the like. In the context of the implement control module 404 and the automated implement control system 420 reference is made to ground and canopy distances (including measured distances and previous measured distances having a higher reliability) for use with controlling the position of a boom 106, such as a sprayer boom. The system 420, module 404 and associated submodules and methodologies described herein are also applicable to the control of implements, chassis position or the like relative to a sensed object or plurality of objects.

Referring again to FIG. 7, the implement control module 404 includes an interface 702 such as a BUS, hardwiring between components such as memory, circuits processors or the like that facilitates communication between the various modules (e.g., circuitry, computer readable media, software modules or the like). As further shown, the implement control module 404 includes a data and power interface 722 configured to provide an interface with a power supply and one or more of the other components of automated implement control system 420, for instance through the interface 500 shown in FIG. 5. Additionally, the implement control module optionally includes an actuator interface configured to interconnect the module 404 with one or more actuators, such as the implement actuator 406 shown in FIG. 4. Optionally, the data and power interface 722 includes the actuator interface 720.

The implement control module 404, as shown in FIG. 7, includes a target selection module 708 that selects a control basis for used by the control module 404 to determine deviation relative to a specified target distance (e.g., 60 inches above the ground as an operator specified boom height, 20 inches above canopy as an operator specified application distance or the like). As described herein the target selection module 708, in one example, receives confidence values from the confidence module 706 and the confidence module in turn determines the confidence values through assessment of measurements (or changes in measurements) of ground and canopy distance with the implement prediction module 704. The target selection module 708 compares the confidence values and selects the potential control base (e.g., ground distance of canopy distance) having the highest confidence, and accordingly the most reliable distance measurements (including measured distances as well as previously retained distances from prior measurements as described herein). The target selection module 708 conducts the assessment of the ground and canopy distances (including changes in the distances) in an ongoing manner, and thereby facilitates handing off of the control basis designation between ground distance and canopy distance according to updated confidence values (e.g. based on forthcoming distance measurements, predictions of the implement position or the like).

As further shown in FIG. 7, a target and deviation module 712 is provided. In one example, the target and deviation module 712 includes a deviation module 716 that compares the ground or canopy distance (whichever is selected by the target selection module as the control basis) relative to a specified target distance and determines the deviation of the implement position relative to the specified target distance. The implement control module 404 uses the determined deviation to accordingly guide the implement 102, such as the boom 106, toward the specified target distance through minimizing of the deviation with corresponding actuator with the implement actuator 406 (e.g., with feedback control or the like, for instance with the actuator module 718). The actuator module 718 shown in FIG. 7 optionally converts the measured deviation to a control signal (directed to eliminate the deviation) delivered through the actuator interface 720 to the implement actuator 406.

In another example, where the selected control basis (ground or canopy in an example) does not match a specified target designation and target distance the substitute target module 714 provides a substitute specified target distance configured to guide movement of the implement toward a position corresponding to the specified target distance, while using a control basis that different from the preference of an operator. For example, the operator preference module 712 includes one or more input preferences, such as a preferred target type (e.g., ground or canopy) called a specified target designation. The module 712 further includes an input preference of a specified target distance to the specified target designation, such as an optimal height of the implement relative to the ground (if ground is the target designation) or an optimal application distance relative to the canopy (if canopy is the designation). In an example, the operator preferences are ground as the specified target designation and 60 inches as the specified target distance. The target selection module 708 selects a non-preferred control basis, in this example canopy based control using the canopy distance 302 shown in FIG. 3 (instead of the ground distance 304). If the specified target distance of 60 inches is applied with canopy distance as the control basis the implement 102 (e.g., the boom 106) would 'fly' up as the actuator module 718 attempts to position the boom 106 60 inches above the canopy. The substitute target module 714 provides a substitute target distance based on the specified target distance usable with a control basis that does not match the operator preference (e.g., the specified target designation). Control of the implement, including guidance of the implement using the control basis (in this example canopy) and the substitute target distance instead of the specified target distance accordingly moves the implement toward the specified target distance corresponding to the operator preferred specified target designation. The deviation module 716 is configured to use the substitute target distance with the control basis (again canopy in this example) to determine the deviation of the implement position relative to the substitute target distance, and facilitate control of the implement position through the actuator module 718. The boom 106 accordingly moves toward the original operator preferred specified target distance while using the non-preferred other control basis (canopy) that is selected as the control basis because of its higher confidence.

Figure 8:
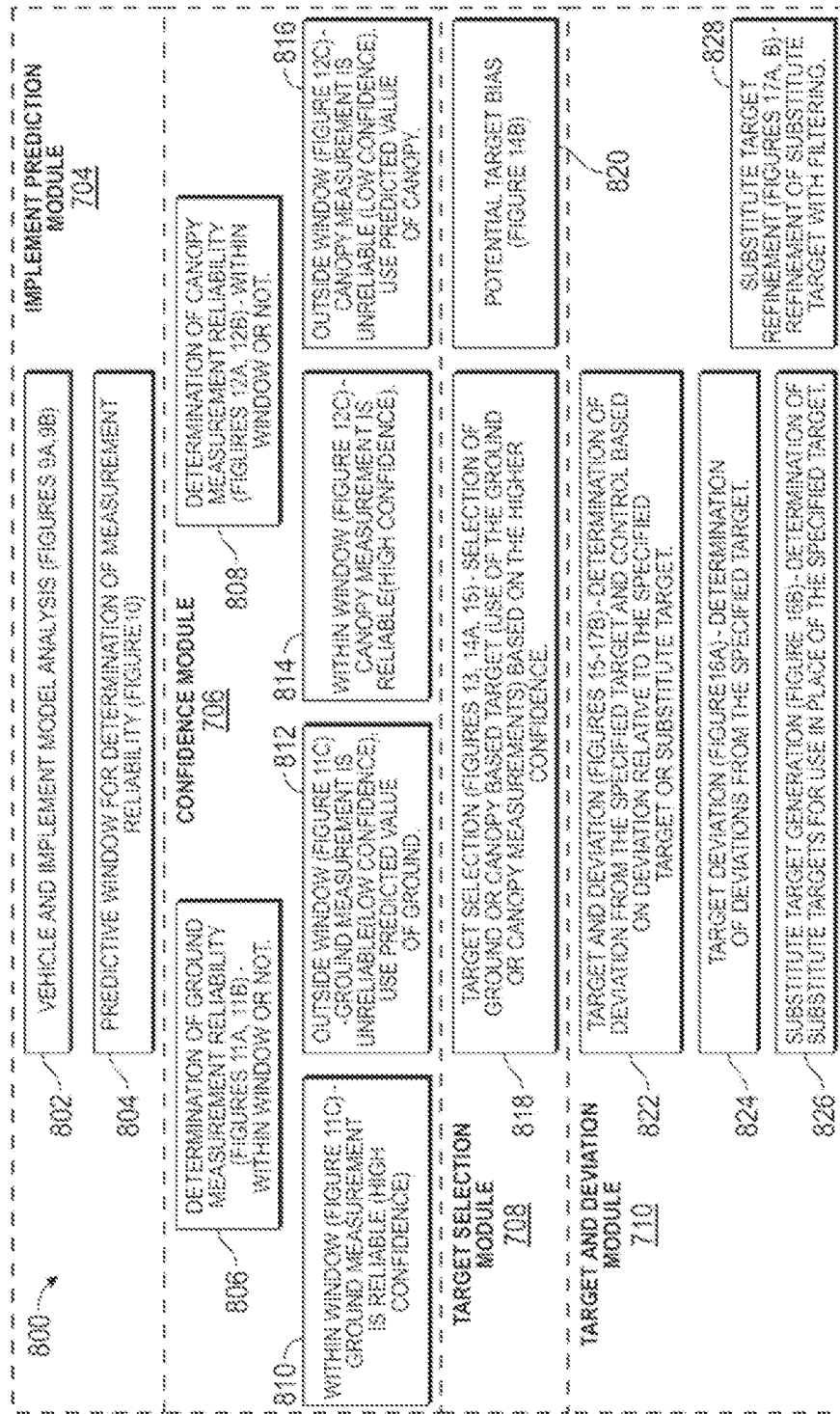
FIG. 8 is a schematic diagram of another example of an implement control module architecture for the automated implement control system.

FIG. 8 is a schematic view of an example implement control module architecture 800 for the implement control module 404. The schematic view provides an overview of the control schematics shown in FIGS. 9A-17B. Referring first to the implement prediction module 704, the module includes a vehicle and implement model analysis component 802 and a predictive window component 804. The model analysis component 802 receives and analyzes one or more kinematic characteristics of the vehicle and implement to generate predicted values (e.g., of implement position including change in implement position). The predictive window element 804, as described herein generates predictive windows 1018 and window shifts 1020 for the predicted values to assess reliability of measurements.

The confidence module 804 includes ground and canopy measurement reliability components 806, 808 configured to compare each of respective ground and canopy distance measurements with the predictive windows. As shown in elements 810-814 varying confidence values are assigned to the measurements (including previously retained values if the measurements are deemed unreliable) based on the location of the measurements (or their previous value counterparts) within or outside of the predictive window 1018.

Figure 11A:
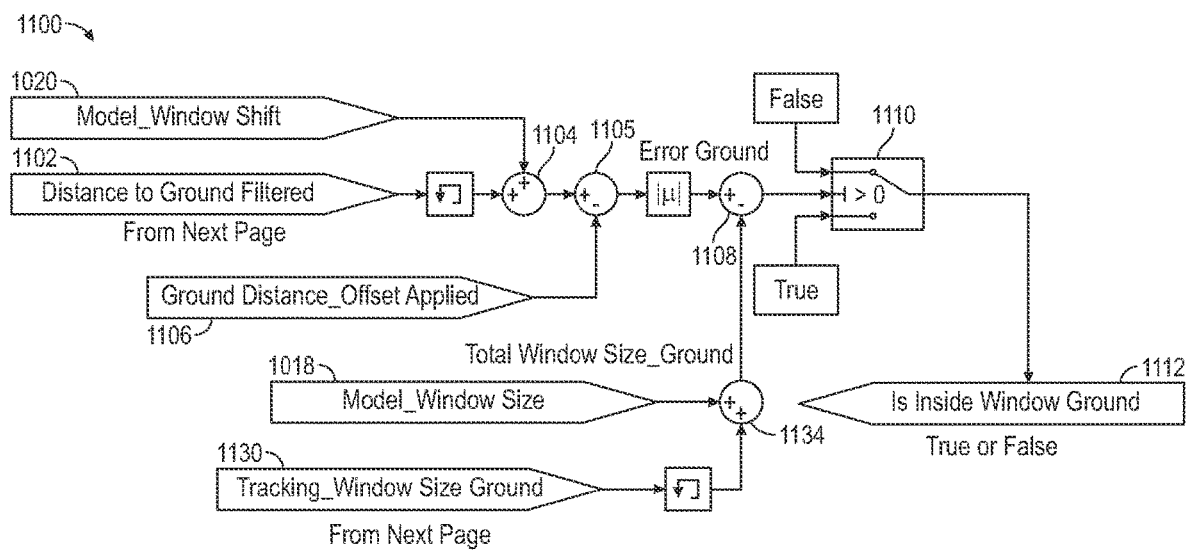
FIG. 11A is a schematic diagram of an example ground reliability module.
Figure 11B:
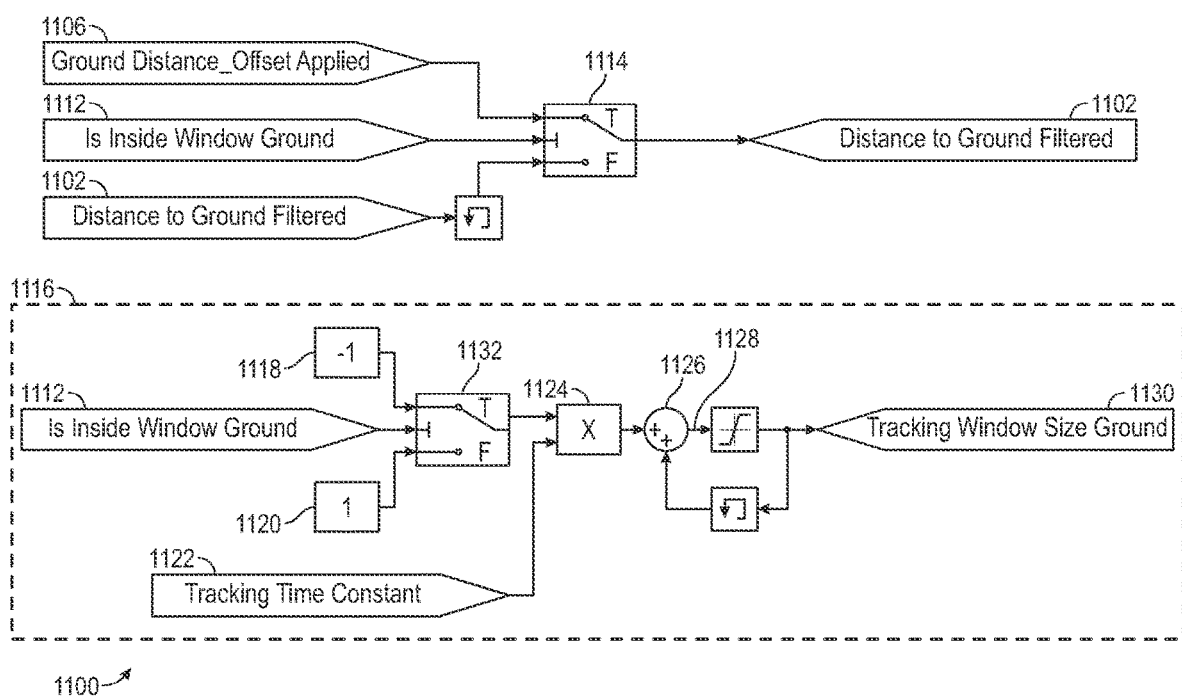
FIG. 11B is another schematic diagram of the ground reliability module of FIG. 11A.
Figure 12A:
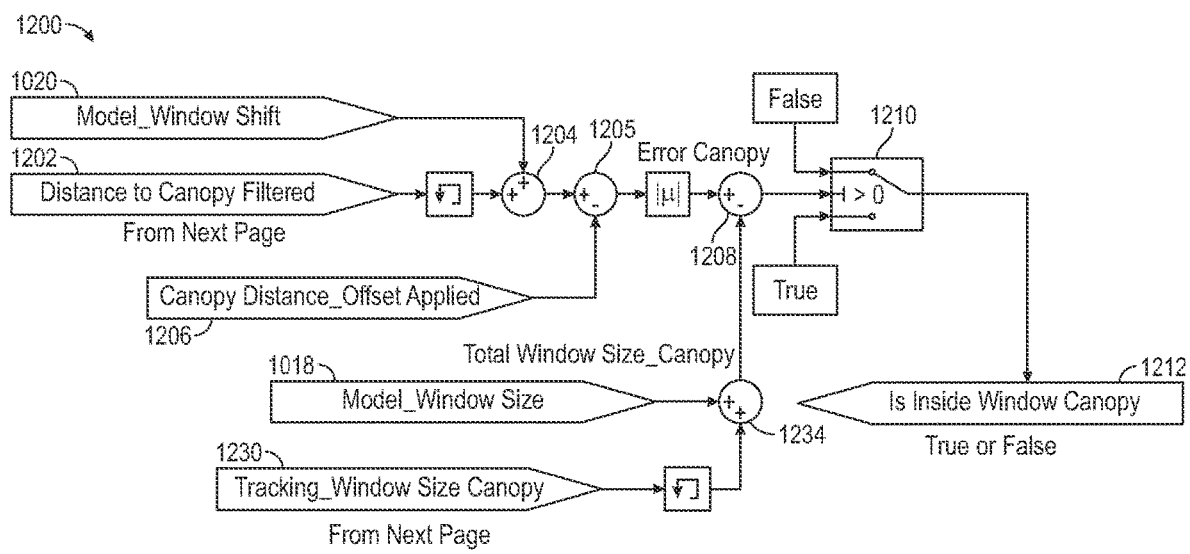
FIG. 12A is a schematic diagram of an example canopy reliability module.
Figure 12B:
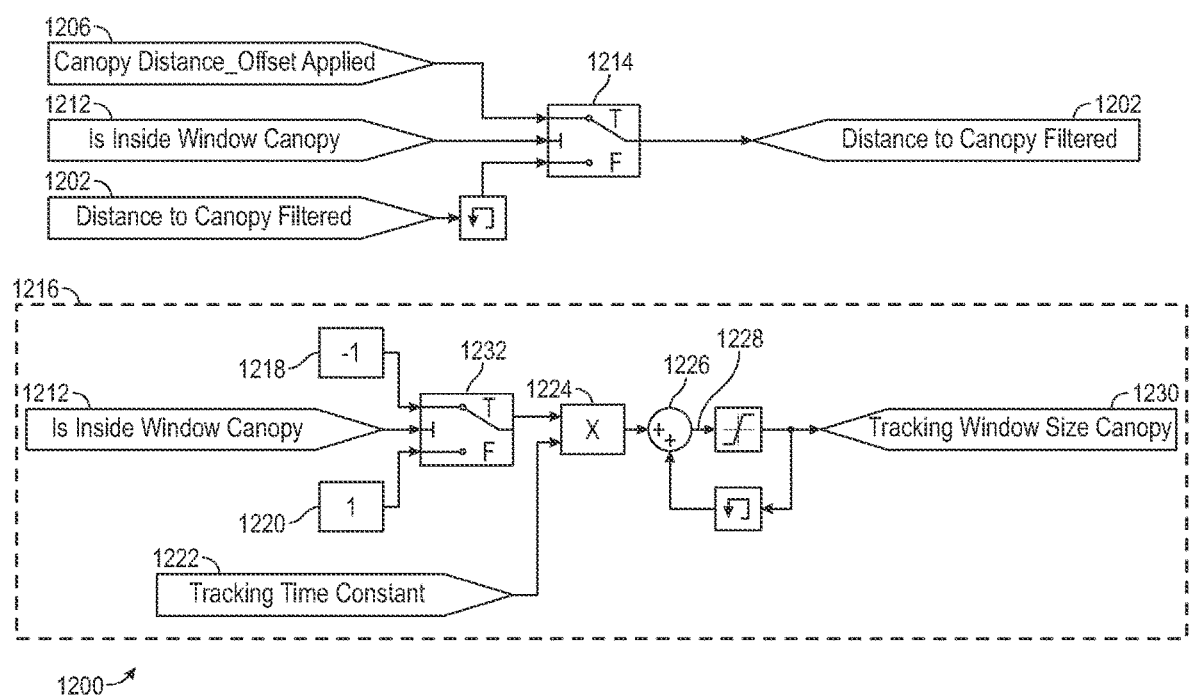
FIG. 12B is another schematic diagram of the canopy reliability module of FIG. 12A.

The target selection module 708, for instance with the element 818, selects either of the ground distance or canopy distance as the control basis by comparing the confidence values assigned to the measured distance to ground 1106 and measured distance to canopy 1206 (and including previously retained values such as distance to ground filtered 1102 or distance to canopy filtered 1202) as shown in FIGS. 11B, C and FIGS. 12B, C. In one example, the target selection module chooses canopy distance (measured values and retained values) or ground distance (measured values and retained values) as the control basis according to whichever of of the distances has the higher comparative confidence value. Further, the target selection module reassigns the control basis to the other, previously not selected, distance type if the confidence comparison changes to favor the other distance type. The target selection module 708 is thereby configured to hand off control between each of the one or more distance types including, but not limited to, ground distance or canopy distance. Optionally, the target selection module 708 includes a potential target bias for one of the distance types. This bias, shown in FIG. 14B, corresponds to an operator or machine based preference for control based on one of ground or canopy distances. For instance, one of the comparative confidences is biased up or down to accordingly weight the control basis to one of ground or canopy based distance control.

Referring again to FIG. 8, the target and deviation module 710 is includes the target and deviation element 822 including the sub-elements of target deviation 824 and substitute target generation 826. Determination of target deviation and substitute target generation 826 are discussed herein in FIGS. 15-16B, and previously discussed in regard to the controller schematic shown in FIG. 7. The target and deviation module 710 further includes a substitute target refinement element 828 configured refine and thereby smooth the substitute target distances determined with the substitute target element 826.

Figure 9A:
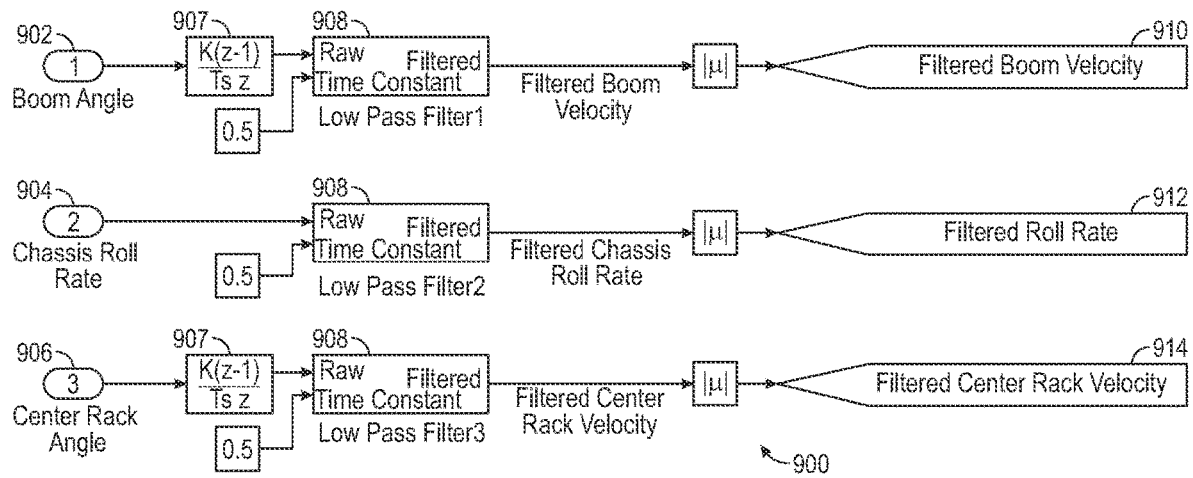
FIG. 9A is a schematic diagram of one example of an implement analysis module with vehicle and implement kinematic inputs.

FIGS. 9A, B are schematic diagrams of one example of an implement analysis module 900 (a sub-module) of the implement control module 404. The implement analysis module 900 receives kinematic characteristics about the vehicle 100 including one or more of dimensions, speed, location, rotation or the like to determine one or more predictive values (and optionally measured or calculated values) associated with the agricultural implement 102. For instance, as provided in the example herein, the implement analysis module 900 analyzes the motion of the vehicle 100 to determine one or more characteristics, such as a composite angular velocity of the implement 102. Another component of the implement control module 404, the implement prediction module 1000, receives the values from the implement analysis module 900 to generate predictive windows and shifts in windows to assess the reliability of measurements from the one or more distance sensors 108 (e.g., shown in FIG. 4).

Referring first to FIG. 9A, the implement analysis module 900 includes one or more inputs associated with corresponding segments (there are three segments in FIG. 9A). In this example, the inputs and their segments include, but are not limited to, the boom angle 902 (e.g., implement angle), chassis roll rate 904 of the vehicle chassis 101 and the implement rack angle 906, an optional second component value associated with the implement 102. The inputs correspond to measurements provided with associated sensors including one or more of accelerometers, speedometers, encoders or the like configured to measure characteristics associated with the respective chassis 101 (roll angle, change in roll angle, rate of roll angle change or the like) and the implement 102 (e.g., the angle of one or more of the booms 106 or the implement rack 103, changes in angles, rates of change of the same or the like).

As further shown in FIG. 9A, derivative elements 907 are provided with one or more of the characteristic inputs in the first and third segments. In this example, derivative elements 907 are associated with the boom angle 902 and implement rack angle 906 segments. The derivative elements generate rates of change (speeds or velocities) for each of these characteristic values to facilitate summation with the chassis roll rate 904 and thereby determine a composite characteristic value for the implement 102 (e.g., one or more of the booms 106). The corresponding derived values as well as the chassis roll rate 904 are, in another example, subject to low pass filters 908 of the implement analysis module 900 to smooth the values prior to summation, for instance by removing spikes, errant values or the like in the velocities or angles that otherwise skew the values used to generate the predictive values (e.g., windows and shifts in the windows). Accordingly, each of the segments generates a corresponding value including, for this example, filtered boom velocity 912, a filtered roll rate 910 and a filtered center rack (implement rack) velocity 914, for instance in units of degrees per second, radians per second or the like.

Figure 9B:
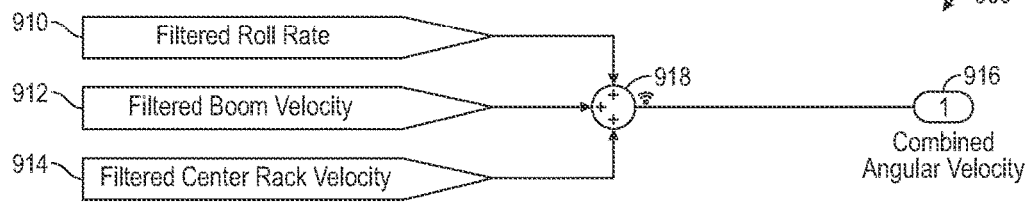
FIG. 9B is another schematic diagram of the implement analysis module of FIG. 9A with an example kinematic output.

Referring now to FIG. 9B, the determined values 910, 912, 914 having common units are summed with the summation element 918 to generate a composite angular velocity 916 of the implement 102 (e.g., a composite implement kinematic value). The composite angular velocity 916 corresponds to the angular velocity of the implement, for instance one or more of the booms 106 (see FIG. 4). When analyzed in combination with the position of each of the sensors 108 corresponding height change values for the implement, for instance proximate to the sensors 108, are generated to accordingly provide predictive windows and predictive window shifts for analysis of measured values of the implement 102. The composite angular velocity 916 is delivered to an implement prediction module 1000 shown in FIG. 10. In an example, the predictive window collectively includes the predictive window shift as well as the predictive window.

As shown in FIG. 8, the implement control module 404 (at 804) generates a predictive window for use in assessing the reliability of measured values, for instance taken with the distance sensors 108 associated with the implement 102. FIG. 10 is a schematic view of one example of an implement prediction module 1000. The prediction module 1000 receives the composite angular velocity 916 of the implement 102. In an example including the implement 102 as a rotating component, a predicted height change is determined based on the input composite angular velocity 916. For instance, the length of the distance sensor from a joint, implement actuator 406 or the like is an example kinematic input 1002. In the example shown in FIG. 4, the distance of one or more of the distance sensors 108 relative to the implement actuator 406 (or rotation joint for the boom 106) is a hypotenuse for a triangle extending between the actuator 406 and the sensor with the angle of the boom 106 as the acute angle of the triangle. As shown in FIG. 10, a predicted height change element receives the composite angular velocity 916 and the at least one kinematic input 1002 corresponding to an angle or change in angle of the implement 102 and the hypotenuse, respectively. The sine function determines a predicted height change value based on the composite angular velocity 916 and the kinematic input 1002. As a convention and an example, the predicted height change is relative to a prior position of the implement 102, for instance the last value corresponding to the height of the boom 106.

As further shown in FIG. 10, the predicted height change value is received at the summation element 1008 and optionally added to one or more supplemental kinematic inputs 1006. In one example, the supplemental kinematic inputs 1006 are distinct from the kinematic input 1002 and include, but are not limited to, changes in an implement rack height, changes in vehicle suspension height, and changes in vehicle suspension (e.g., changes to damping coefficients or spring constants) or the like. The height changes (kinematic inputs 1006) are optionally received at the summation element 1008 to provide a total predicted height change for further analysis.

Referring again to FIG. 10, the predicted height change (or total predicted height change) is used to determine a predictive window for analysis of the reliability of distances measured with the distance sensors 108. The predictive window provides a range of values position measurements (e.g., distance measurements from the sensors 108) should be within. As described herein, measurements outside of the predictive window are in various examples disregarded or further analyzed, for instance with modification of the predictive window.

As shown in FIG. 10 the example predictive window includes a predictive window 1018 and a predictive window shift 1020 (for the window 1018). A composite predictive window adds these values to a window size modification 1130 input (see FIG. 11A having the summation element 1134). As shown in FIGS. 11A, B and 12A, B actual measured distances (including changes in distance or height from a prior value) that fall within the shifted window determined with the implement prediction module 1000 have a higher reliability, and are accordingly considered 'good' data. These measured distances (e.g., of the distance sensors 108) thereby have a higher likelihood for use as the values for control of the implement position including height. Conversely, actual measured distances (changes in distance or height from a prior value) outside of the modified window (e.g., shifted, expanded or contracted) have a lower reliability, may be 'bad' data, and as described herein are disregarded (e.g., in favor of a previous 'good' value of implement position) or further analyzed, for instance, to determine if the measurements are in fact 'good' data and modification of the predictive window is warranted to capture forthcoming measurements.

The predictive window 1018 (the kinematic portion of the composite window generated with the summation element 1134 in FIG. 11A) is determined with a predictive window element 1014. As shown in FIG. 10, a reliability gain 1010 is received at the predictive window element 1014 along with the predicted height change (or total predicted height change). As previously described, the predicted height change is, in one example, a value corresponding to a predicted height change relative to a prior position (height) of the implement, such as the boom 106. The predicted height change is multiplied by the reliability gain 1010 at the predictive window element 1014 to determine the predictive window 1018 (e.g., a window size or range of values). In an example, the predictive window corresponds to a range of predictive height change values (i.e., predicted height changes of ±6 inches, 12 to −3 inches, 0 to −10 inches relative to the previous boom height or the like) that are maintained (or contracted) according to the reliability gain 1010.

In one example, the reliability gain 1010 is a static value, for instance set by an operator based on known variations in the terrain (e.g., the reliability gain is low for rough terrain or relatively higher for planar or consistent terrain). A higher reliability gain 1010 (e.g., a value closer to 1) corresponds to an assessment of higher reliability that the predicted height change is reasonable. In contrast, a lower reliability gain 1010 (e.g., a value less than 1, such as 0.12 or the like) corresponds to a lower assessment of reliability because of the unpredictability of rough (e.g., broken, uneven, shifting or angled) terrain and thereby indicates the predicted height change is less reliable. Accordingly, a higher reliability gain 1010 (e.g., 0.75 or more) maintains a large predictive window 1018 (including maintaining the predicted height change value or modestly contracting the value) and accordingly facilitates the capture of measured distance values within the window. In contrast, a lower reliability gain 1010 (e.g., 0.25 or less) contracts the predictive window 1018 and thereby minimizes the capture of measured distances to those values within the smaller window. In another example, the maintained (larger) and contracted (smaller) windows ensure corresponding measured values are captured in either of a broad high reliability window and thereby deemed reliable or, in the case of a narrow low reliability window only measured values that fall within the narrow (contracted) band of the low reliability gain modified window are deemed reliable.

As further shown in FIG. 10, another branch of the predicted window determination includes the predictive window shift 1020. The predictive window shift 1020 corresponds to a shift in location of the predictive window 1018. For instance, as previously described the predictive window 1018 includes a range of values, such as ±6 inches, 12 to −3 inches relative to the a prior implement position or height. The predictive window shift 1020 is additive and shifts the range to account for changes in the terrain, for instance including inclination, declination, change in pitch or roll or the like. The predictive window shift element 1016 controls the location of the predictive window by changing the ceiling and floor values of the range while maintaining the breadth of the range. In an example, the predictive window shift is included as a component of the predictive window, and accordingly the predictive window, in this example, collectively includes the predictive window shift as well as the predictive window.

For example, with the predictive windows 1018 described above, ±6 inches, 12 to −3 inches, the predictive window shift element 1016 uses another example reliability gain 1012 (a static or dynamic gain) to determine the predictive window shift 1020. In one example, as the terrain is inclining the predicted window for the implement height (or height change) trends down as the implement moves closer to the rising terrain and a low gain is needed because of the unpredictability of the terrain variation (including a gain of 0 or proximate to 0). Accordingly, the predictive window shift element 1016 with a reliability gain moves the predictive window 1018 down (closer to the inclined ground). The reliability gain 1012 decreases the predictive window shift 1020 according to its value. For instance, the predictive window of ±6 inches may change to −11 to 1 inches, a net change of 5 inches downward while the range of the predictive window 1018 remains 12 total inches. With a reliability gain of 0.5 the shift is instead 2.5 inches, and the corresponding predictive window −8.5 to 3.5 inches (and the range remains 12 total inches) and less than the shift otherwise specified. In another example, for instance, as the implement is deployed from a stowed position to an initial application height the boom moves a large distance and possibly at a relatively high velocity. In this example, the reliability gain is optionally higher, such 1, 0.9 or the like because deployment is consistent has a limited risk of collision with the ground or flying up of the boom.

The determination of ground measurement reliability at 806 is conducted in one example with a ground reliability module, such as the ground reliability module 1100 shown in FIGS. 11A, B. The ground reliability module 1100 analyzes the reliability of the measured position of the implement 102, for instance the distance of the boom 106 (shown in FIG. 4) relative to the ground. In contrast, FIGS. 12A, B show an example canopy reliability module 1200 configured to analyze the measured position of the implement 102 relative to the canopy. The reliability modules 1100, 1200 assess the reliability of the respective measurements (distance to ground or distance to crop canopy) relative to the predictive window previous described herein including the predictive window 1018 and optionally the predictive window shift 1020.

Referring first to FIG. 11A, the module 1100 uses a previous filtered value 1102 (e.g., distance to ground filtered or DGF) for implement position, for instance determined at the opposed end of the module 1100 proximate to the 1114 condition element described herein. The previous filtered value 1102 corresponds to a previous implement position (in this example relative to the ground), such as a preceding height of the boom 106. The predictive window shift 1020 determined with the implement prediction module 1000 is added to the previous filtered value 1102 at the summation element 1104 to adjust the previous filtered value 1102 according to the predicted intervening change (if any) to an adjusted filtered value.

The ground reliability module includes a difference element 1105 (e.g., a comparator) that assess a difference between the adjusted filtered value provided by the summation element 1104 and a measured distance to ground 1106. The measured distance to ground is the measurement value returned by one or more of the distance sensors 108 associated with the implement 102, such as the boom 106. The difference element 1106 generates a ground error between the adjusted filtered value and the measured distance to ground. The ground error corresponds to the variation of the measured distance relative to the preceding filtered value (adjusted based on the predictive window shift 1020).

The ground error is delivered to another difference element 1108 for assessment relative to the predictive window 1018 generated with the implement prediction module (e.g., a range of values corresponding to a predicted range of movement for the implement) shown in FIG. 10. The difference element 1108 assesses whether the ground error (based on the measured distance to ground) is within the predictive window 1018 to determine the reliability of the distance to ground measurement. According to the convention shown in FIG. 11A, if the value generated by the difference element 1105 is less than or equal to zero (0) the ground error and the corresponding measured distance to ground are within the predictive window 1018. The measured distance to ground is thereby indicated as reliable. If the value generated by the difference element 1105 is greater than zero (0) the ground error and its corresponding measured distance to ground are outside of the predictive window 1018 and thereby indicated as unreliable. In an example described herein, a measured distance to ground having the unreliability indication is further analyzed including, in one example, modification of the predictive window. For example, the ground reliability module 1100 shown in FIG. 11A optionally includes a window size modification 1130 input interrelated with a window size modification submodule 1116 shown in FIG. 11B.

Referring again to FIG. 11A, the ground reliability module 1100 in this example includes a condition element that provides a notification of 'true' if the comparison of the ground error corresponding to the measured distance to ground is within the predictive window 1018, in this example, if the value returned by the difference element 1105 is less than or equal to zero (0). The condition element provides a 'false' notification if the value is greater than zero (0) corresponding to the ground error and the corresponding measured distance to ground are outside of the predictive window 1018. The true of false indication is a window capture condition 1112.

The assessment of the distance to ground measurement (measured distance 1106) by way of comparison of the ground error with the predictive window 1018 determines whether the measured distance 1106 or the previous filtered value 1102 is more reliable. The corresponding window capture condition 1112 (true or false) indicates the higher reliability and is used within the condition element 1114 in FIG. 11B to update the previous filtered value 1102 (e.g., distance to ground or DGF). If the window capture condition 1112 is true the ground error for the measured value 1106 is within the predictive window 1018 and the previous filtered value 1102 is updated to 1102' and matches the measured value 1106. If the window capture condition is false, and thereby corresponds to the measured value outside the predictive window, the previous filtered value 1102 remains at the present value (e.g., as value 1102'). For instance, the measured value 1106 is ignored, at least for the time being, in favor of the previous filtered value 1102. As previously described the previous filtered value 1102 (now 1102' whether updated or maintained at the previous value) is returned to the beginning of the ground reliability module 1100 for use in assessment of ongoing distance measurements 1106.

Figure 11C:
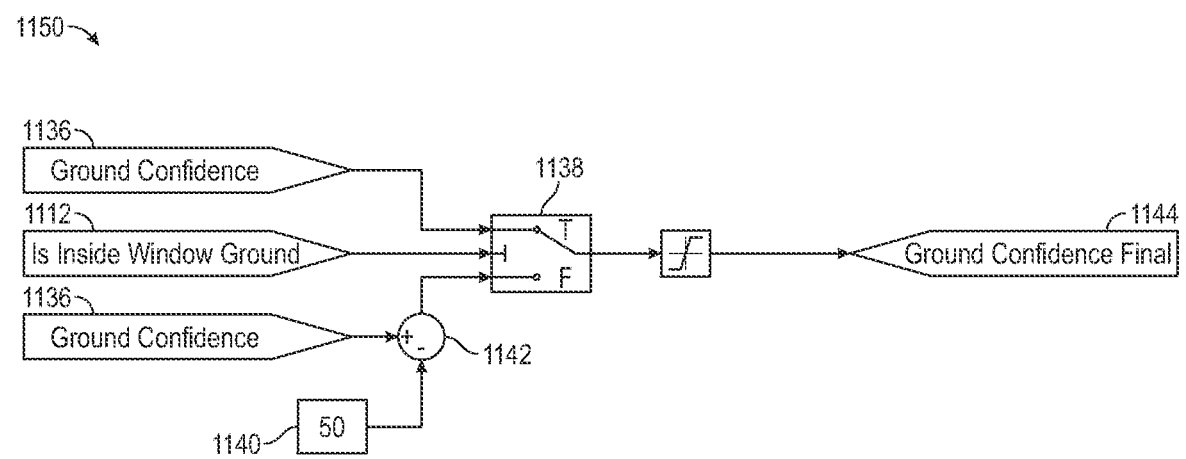
FIG. 11C is a schematic diagram of an example ground confidence module.
Figure 12C:
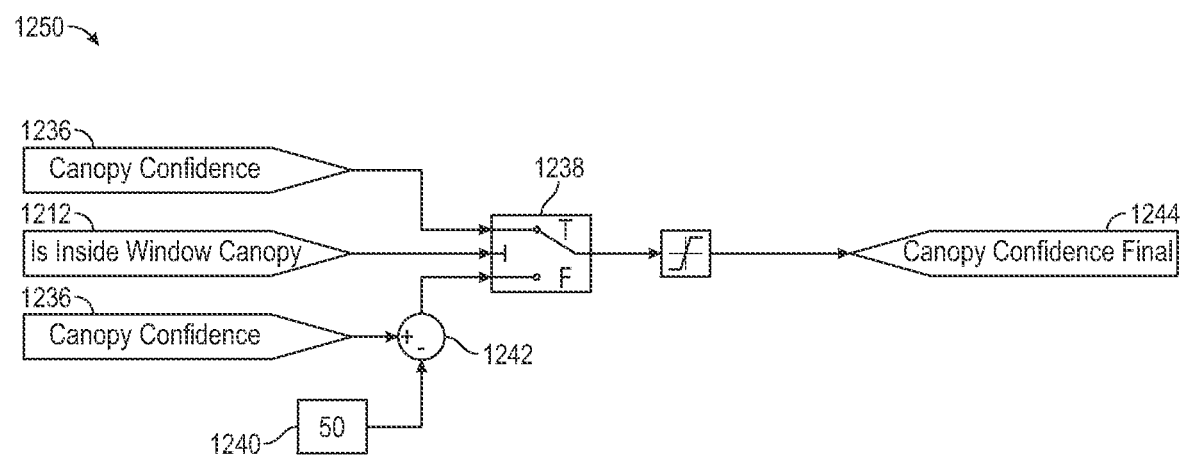
FIG. 12C is a schematic diagram of an example canopy confidence module.
Figure 13:
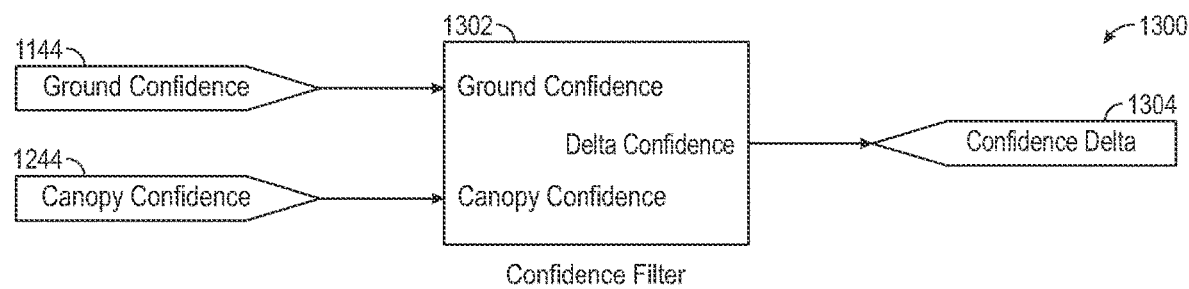
FIG. 13 is a schematic diagram of an example target selection module.

In another example, the distance sensors 108 are configured to measure one or more types of object, such as the ground, canopy, furrow depth, crop residue height and a comparison of confidences as shown in forthcoming FIGS. 11C, 12C and 13 is not performed, and a control basis is not handed off (e.g., from canopy to ground or ground to canopy). Instead, the reliability module 1100 (and similarly the reliability module 1200) provides a control basis having the retained or updated values of the measured distance 1106 and distance to ground filtered 1102. The predictive window 1018 is used to retain measurements within the window and discard measurements outside of the window 1018 (although the discarded measurements are used to iteratively adjust the window as described herein). The distance to ground filtered 1102 (e.g., 1102') on the right side of the condition element 1114 corresponds to either the newly retained measured distance 1106 or the previous distance to ground filtered. The implement control module 404 thereby uses the conditioned distance to ground filtered 1102 for control of implement position without handing off control to another target type (e.g., canopy distance).

In some examples the measured distance 1106 (e.g., distance to ground) measured by the distance sensor 108 is outside of the predictive window 1018, but is not a 'bad' unreliable measurement as is otherwise the determination when outside the window. For example, the terrain sensed with the distance sensors 108 includes significant variation caused by declination, inclination, holes, furrows or the like. Alternatively, in the example including the measured distance to the canopy 1206, described herein, the crops constituting the canopy include widely varying heights, variations in hydration that obscure canopy measurement, gaps in the crops or canopy or the like. In these examples, the measured distances to these features are in fact 'good' measurements that in other systems are errantly ignored or discarded. In the present system, the ground reliability module 1100 includes an optional window size modification submodule configured to further analyze these distance measurements (and forthcoming distance measurements) through modification of the predictive window.

As shown in FIG. 11B, the window size modification submodule 1116 (shown in dashed lines) receives the window capture condition 1112. The 'false' condition at the condition element 1132 triggers an expansion prompt 1120. As described herein the expansion prompt 1120 (a positive one (1)) initiates a graduated expansion of the predictive window 1018 to facilitate capture of potentially 'good' measured distances 1106. A tracking time constant 1122 corresponding to a rate of change for the window modification and the expansion prompt 1120 are received at a modification element 1124. The modification element 1124 multiplies the tracking time constant 1122 and the expansion prompt to provide a graduated expansion factor. A repetition loop 1128 including a summation element 1126 then develops a window size modification 1130 by adding the expansion factor to itself until the ground error (shown in FIG. 11A as the output of the difference element 1105) is within the modified window including the predictive window 1018 and the window size modification 1130. For example the window size modification 1130 is iteratively increased until the ground error is within the updated window (including the original predictive window 1018 and the modification 1130). Suspension of the iterative increase is shown with the saturation block (having floor and ceiling values for contraction and expansion) in the repetition loop 1128 of FIG. 11B. As shown in FIG. 11A, the window size modification 1130 is provided to a summation element 1134 and added to the predictive window 1018. The updated and now larger predictive window is compared with the ground error with the difference element 1108 to determine if the measured distance 1106 (such as the next or forthcoming measured value after the triggering measurement) is within the updated window. In one example, if the ground error for the measured distance 1106 is not within the updated window a 'false' condition from the condition element 1110 triggers another expansion prompt 1120 and a corresponding expanding window size modification 1130. Accordingly, measured distances 1106 that are 'good' but initially outside of the predictive window 1018 and thereby indicated as unreliable are accurately reclassified (or later measured distances are classified) as reliable with the window size modification submodule 1116 with modification of the predictive window by the window size modification 1130.

In another example, the window size modification submodule 1116 is used with measured distances 1106 having corresponding ground errors within the predictive window 1018 (or previously updated window including a window size modification) in contrast to being outside the window as described above. In this example, the predictive window 1018 is contracted around the previous ground error to refine capture of forthcoming measured distances 1106. For instance, a contraction prompt 1118 is triggered with the condition element 1132 according to a preceding 'true' (within the predictive window) capture condition 1112. As shown in FIG. 11B, the contraction prompt 1118 is a negative one (−1) and is multiplied by the modification time constant 1122 at the modification element 1124 to accordingly generate a contracting window size modification 1130. The contracting window size modification 1130 is provided to the summation element 1134 (in FIG. 11A) to accordingly contract the predictive window 1018. Measured distances 1106 within the contracted window accordingly have a higher reliability than values in the previous larger window. The measured distances 1106 assessed in the contracted window and having higher reliability thereby refine and enhance the maintenance of the previous filtered value 1102 (if the distances 1106 are outside the contracted window) and updating the value 1102 to the measured distance 1106 (if the distances 1106 are within the contracted window) at the condition element 1114.

An example ground confidence module 1150 for the implement control module 404 is shown in FIG. 11C. In the example shown, the condition element 1138 uses the window capture condition 1112 (e.g., having 'true' or 'false' values) previously determined with the ground reliability module 1100 to provide a comparative ground confidence 1144 for comparison with a corresponding comparative canopy confidence 1244 (see FIG. 12C). In this example, the ground confidence value 1136 of the ground confidence module 1150 corresponds to a confidence value provided by the one or more distance sensors 108 (e.g., a sensor confidence). In addition to the base measurement value (e.g., 40 inches, 52 inches or the like) the distance sensors 108, in examples, provide a confidence value for the measurement. The confidence value provided by the sensor in various examples corresponds to one or more of a number of clustered reflections at the target (e.g., the ground), standard deviation, resolution of the measurement, signal strength or the like that are represented with a numerical confidence value as the ground confidence value 1136.

Referring to FIG. 11C, the window capture condition 1112 is received at the condition element 1138. The condition element 1138 chooses a first ground confidence value 1136 (the upper or 'true' branch) or a second ground confidence value 1136 further modified with a confidence weight 1140 (the lower of 'false' branch). For instance, if the ground error corresponding to the measured distance 1106 is within the predictive window 1018 as shown in FIG. 11A, the window capture condition 1112 is 'true' and accordingly the condition element 1138 updates the comparative ground confidence 1144 to the ground confidence value 1136 (e.g., corresponding to the sensor confidence described herein). Conversely, if the ground error is outside of the predictive window 1018, the window capture condition 1112 is 'false' and accordingly the condition element 1138 selects from the lower branch including the ground confidence value 1136 further modified downward with the difference element 1142 by the confidence weight 1140. The confidence weight 1140 is optionally static or dynamic. In one example, the confidence weight 1140 is varied in a graduated manner according to the relative deviation of the measured ground distance 1106 relative to the predictive window 1018 (e.g., the composite window including the window modification 1130 and the predictive window 1018). For instance, a larger deviation from the window may prompt an increase in the confidence weight 1140. The comparative ground confidence 1144 is updated to the lower confidence value, the ground confidence value 1136 (e.g., a sensor based confidence) minus the confidence weight 1140. As described herein, the comparative ground confidence 1144 is compared with the comparative canopy confidence 1244 to thereby select the distance measurement (ground or canopy) deemed most reliable (see FIGS. 13 and 14A, B).

FIGS. 12A-C provide another example of reliability analysis and confidence generation. In this example, the implement control module 404 includes a canopy reliability module 1200 configured to determine the reliability of distance measurements from the sensor 108 to the canopy of the crop. Features shown in FIGS. 12A-C are similar in at least some regards to those previously shown in FIGS. 11A-C and described herein. For instance, the module 1200 receives as an input a previous filtered value 1202 corresponding in this example to a distance to canopy (e.g., distance to canopy filtered or DCF). The previous filtered value 1202 corresponds to a previous implement position (in this example relative to the canopy), such as a preceding height of the boom 106 or sensor relative to the canopy. The predictive window shift 1020 determined with the implement prediction module 1000 is added to the previous filtered value 1202 at the summation element 1204 to adjust the previous filtered value 1102 according to the predicted intervening change (if any) to an adjusted filtered value.

The canopy reliability module 1200 includes a difference element 1205 (e.g., a difference element is an example of a comparator) that assesses a difference between the adjusted filtered value provided by the summation element 1204 and a measured distance 1206. The measured distance to canopy 1206 is the measurement value returned by one or more of the distance sensors 108 associated with the implement 102, such as the boom 106. The measured distance corresponds to the distance from the canopy to the sensor optionally offset to account for vertical position differences between the sensor and the implement 102. The difference element 1205 generates a canopy error between the adjusted filtered value and the measured distance to ground 1206. The ground error corresponds to the variation of the measured distance relative to the preceding filtered value 1202 (adjusted based on the predictive window shift 1020).

The predictive window 1018, generated with the implement prediction module (e.g., a range of values corresponding to a predicted range of movement for the implement) shown in FIG. 10, is received at the difference element 1208 to assess whether the canopy error is within the predictive window 1018 to determine the reliability of the distance to canopy measurement 1206. As in the ground reliability module 1100, the canopy reliability module 1200 is optionally configured to further analyze canopy measurements outside of the predictive window 1018, for instance with modification of the predictive window.

Referring again to FIG. 12A, the canopy reliability module 1100 includes a condition element 1210 having a 'true' notification if the comparison of the canopy error corresponding to the measured distance to canopy 1206 is within the predictive window 1018. The condition element 1210 provides a 'false' notification if the value is outside of the predictive window 1018. The true of false indication is a window capture condition 1212.

The assessment of the distance to canopy measurement (measured distance 1206) by way of comparison of the canopy error with the predictive window 1018 determines whether the measured distance 1206 or the previous filtered value 1202 is more reliable. The corresponding window capture condition 1212 (true or false) indicates the higher reliability and is used within the condition element 1214 in FIG. 12B to update the previous filtered value 1202 (e.g., distance to canopy or DCF). If the window capture condition 1212 is true the canopy error for the measured value 1206 is within the predictive window 1018 and the previous filtered value 1202 is updated to 1202' to match the measured value 1206. If the window capture condition 1212 is false, and thereby corresponds to the measured value outside the predictive window, the previous filtered value 1202 remains at the present value (e.g., as value 1202'). For instance, the measured value 1206 is ignored, at least for the time being, in favor of the previous filtered value 1202. As previously described the previous filtered value 1202 (now 1202' whether updated or maintained at the previous value) is returned to the beginning of the canopy reliability module 1200 for use in assessment of ongoing distance measurements 1206.

As with the ground measured distance 1106 (e.g., distance to ground) described herein the measurements are 'good' but outside of the predictive window 1018. In a similar manner 'good' canopy measured distances 1206 are in some examples also outside of the predictive window 1018, but still 'good' (or true) measurements that happen to fall outside of a predictive window 1018 predicated on earlier measurements and stored values without taking into account instant or contemporaneous measurements. In the example including the measured distance to the canopy 1206 the crops constituting the canopy include widely varying heights, variations in hydration that obscure canopy measurement, gaps in the crops or canopy or the like. In these examples, the measured distances to these features are in fact 'good' measurements that in other systems are errantly ignored or discarded. In the present system (e.g., with the implement control module 404), the canopy reliability module 1200 includes an optional window size modification submodule 1216 configured to further analyze these distance measurements (and forthcoming distance measurements) through modification of the predictive window 1018.

As shown in FIG. 12B, the window size modification submodule 1216 (shown in dashed lines) receives the window capture condition 1212 with the 'false' condition at the condition element 1232 triggering an expansion prompt 1220. A tracking time constant 1222 corresponding to a rate of change for the window modification and the expansion prompt 1220 are received at a modification element 1224. The modification element 1224 multiplies the tracking time constant 1222 and the expansion prompt to provide a graduated expansion factor. A repetition loop 1228 including a summation element 1226 then develops a window size modification 1230 by adding the expansion factor to itself until the canopy error (shown in FIG. 12A as the output of the difference element 1205) is within the modified window including the predictive window 1018 and the window size modification 1230. For example the window size modification 1230 is iteratively increased until the ground error is within the updated window (including the original predictive window 1018 and the modification 1230). Optionally, the increase (or decrease) is suspended with a saturation block having a floor and ceiling value to limit expansion and contraction as shown in the repetition loop 1228. As shown in FIG. 12A, the window size modification 1230 is provided to a summation element 1234 and added to the predictive window 1018. The updated and now larger predictive window is compared with the canopy error with the difference element 1208 to determine if the measured distance 1206 (e.g., the next or forthcoming value or measurement of the canopy distance 1206) is within the updated window. In one example, if the ground error for the measured distance 1206 is not within the updated window a 'false' condition from the condition element 1210 triggers another expansion prompt 1220 and a corresponding expanding window size modification 1230. Accordingly, measured distances 1206 that are 'good' but initially outside of the predictive window 1018 and thereby indicated as unreliable are accurately reclassified as reliable with the window size modification submodule 1216 with modification of the predictive window by the window size modification 1230.

In another example, the window size modification submodule 1216 is used with measured distances 1206 having (corresponding canopy errors) within the predictive window 1018. In this example, as with the ground errors described above the predictive window 1018 is contracted around the previous canopy error to refine capture of forthcoming measured distances 1206. For instance, a contraction prompt 1218 is triggered with the condition element 1232 according to a preceding 'true' (within the predictive window) capture condition 1212. The contraction prompt 1218 is negative and is multiplied by the modification time constant 1222 at the modification element 1224 to accordingly generate a contracting window size modification 1230. The contracting window size modification 1230 is provided to the summation element 1234 (in FIG. 12A) to accordingly contract the predictive window 1018. Measured distances 1206 within the contracted window accordingly have a higher reliability than values in the previous larger window. The measured distances 1206 assessed in the contracted window and having higher reliability thereby refine and enhance the maintenance of the previous filtered value 1202 (if the distances 1206 are outside the contracted window) and updating the value 1202 to the measured distance 1206 (if the distances 1206 are within the contracted window) at the condition element 1214.

FIG. 12C is an example canopy confidence module 1250 for the implement control module 404. The condition element 1238 uses the window capture condition 1212 previously determined with the canopy reliability module 1200 to provide a comparative ground confidence 1244 for comparison with the corresponding comparative canopy confidence 1144 (see FIG. 11C). In this example, the canopy confidence value 1236 of the canopy confidence module 1250 corresponds to a confidence value provided by the one or more distance sensors 108 (e.g., a sensor confidence). In addition to the base measurement value (e.g., 20 inches, 32 inches or the like) the distance sensors 108, in examples, provide a confidence value for the canopy measurement. The confidence value provided by the sensor in various examples corresponds to one or more of a number of clustered reflections at the target (e.g., the canopy), standard deviation, resolution of the measurement, signal strength or the like that are represented with a numerical confidence value as the canopy confidence value 1236.

Referring again to FIG. 12C, the window capture condition 1212 is received at the condition element 1238. The condition element 1138 assigns a first canopy confidence value 1236 (the upper or 'true' branch) or a second canopy confidence value 1236 further modified with a confidence weight 1240 (the lower of 'false' branch). For instance, if the canopy error corresponding to the measured distance 1206 is within the predictive window 1018 as shown in FIG. 12A, the window capture condition 1212 is 'true' and accordingly the condition element 1238 updates the comparative canopy confidence 1244 to the canopy confidence value 1236 (e.g., corresponding to the sensor confidence described herein). Conversely, if the ground error is outside of the predictive window 1018 and thereby a 'false' window capture condition 1212 the condition element 1238 selects from the lower branch including the canopy confidence value 1236 further modified downward with the difference element 1242 by the confidence weight 1240. The confidence weight 1140 is optionally static or dynamic. The comparative canopy confidence 1244 is updated to the lower confidence value, the canopy confidence value 1236 (e.g., a sensor based confidence) minus the confidence weight 1240. As described herein, the comparative canopy confidence 1244 is compared with the comparative ground confidence 1144 to thereby select the distance measurement (ground or canopy) deemed most reliable (see FIGS. 13 and 14A, B).

Figure 14A:
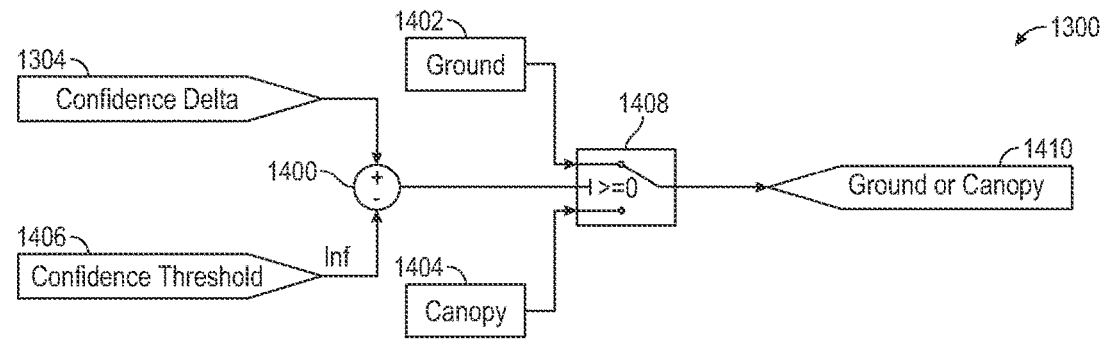
FIG. 14A is a schematic diagram of a portion of the target selection module of FIG. 13.
Figure 14B:
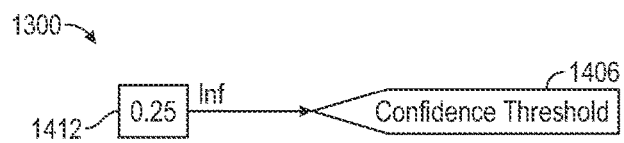
FIG. 14B is a schematic diagram of a portion of the target selection module of FIG. 13.

FIGS. 13, 14A and 14B show an example target selection module 1300 corresponding to element 818 (and optionally element 820) with the example implement control module architecture of FIG. 8. The target selection module 1300 compares the comparative ground and canopy confidences 1144, 1244 and, based on the comparison, selects either of the ground measured distance 1106 or the canopy measured distance 1206 for control of the implement 102, for instance as the chosen signal for measurement of the implement relative to the ground or canopy, respectively.

Referring first to FIG. 13, as shown each of the ground and canopy comparative confidences 1144, 1244 are provided to a confidence filter 1302 in this example. The confidence filter 1302 smooths the input confidences to accordingly remove spikes and trough in confidence values corresponding to inconsistent sensor confidence values received from the sensors 108 (e.g., the ground confidence value 1136 or canopy confidence value 1236 of FIGS. 11C, 12C). Additionally, in the example shown in FIG. 13, the confidence filter 1302 includes a comparator, such as a difference element, that subtracts one of the confidences from the other. In this example, the comparative canopy confidence 1244 is subtracted from the comparative ground confidence 1144 to determine a confidence difference 1304 (confidence delta or the like). In one example, the confidence difference 1304 (if positive) indicates the comparative ground confidence 1144 is greater than the canopy confidence 1244 thereby indicating the ground measured distance 1106 is more reliable than the canopy measured distance 1206.

In another example, shown in FIG. 14A, a target bias 1406 is provided to the target selection module 1300 to bias the confidence evaluation and corresponding target selection toward one of the measured distances 1106, 1206. A difference element 1400 receives the target bias 1406 and the confidence difference 1304. In an example favoring selection of the measured ground distance 1106 a negative target bias 1406 is provided to the difference element 1400. When the negative target bias 1406 is subtracted (thereby making its value positive and prompting addition) from the confidence difference 1304 the confidence difference accordingly increases. In the convention provided in the target selection module 1300 the increased confidence difference favors the ground measured distance 1106.

With a converse (positive) target bias 1406 the difference element 1400 decreases the confidence difference 1304 (the bias is subtracted) thereby biasing the target selection based on the confidence difference toward the canopy measured distance 1206. In still other examples, the target bias 1406 is variable, and optionally changes according to location of the vehicle 100 in a field (e.g., elevations, previous indexed yield values or the like); the crop in the present row(s) under application; hydration of the crop (e.g., based on rainfall) or the like. For instance, after a heavy rain the target bias 1406 is optionally increased from a previous bias value to favor control based on the canopy measured distance 1206 because the crop is well hydrated and thereby readily sensed with the distance sensors 108. In another example, the target bias 1406 is optionally decreased to a negative value less than the previous bias value because of decreased hydration, immaturity of the crop (and corresponding lesser canopy coverage) or the like to accordingly favor selection of the ground measured distance 1106 because the crop is difficult to detect, and accordingly the ground should (generally) provide a more reliable target.

FIG. 14B shows one example of a target bias input 1412 for use as the target bias 1406. In another example, the target bias input 1412 includes an operator accessible feature (dial, touchscreen, toggles or the like) to facilitate variation of the target bias input 1412 and the corresponding the target bias 1406. In still another example, the target bias input 1412 includes one or more functions, algorithms or the like configured to automatically control (e.g., change, maintain or the like) the target bias 1406, for instance according to conditions described above such as hydration, crop maturity, crop identification, field conditions or the like.

Referring again to FIG. 14A, a condition element 1408 receives the confidence difference 1304 (or biased confidence difference) and designates either of the ground selection 1402 or the canopy selection 1404. According to the convention shown a positive confidence difference 1304 or biased confidence difference triggers the ground selection 1402 by the condition element 1408 while a negative confidence difference (or biased confidence difference) triggers the canopy selection 1404. The condition element 1408 updates the target selection 1410 (e.g., the control basis) and the implement control module 404 accordingly proceeds with control of the implement 102, for instance of one or more booms 106, based on the ground or canopy measured distances 1106, 1206 corresponding to the target selection 1410. For instance, control of the implement actuator 406 to position the boom 106 (shown in FIG. 4) at a specified height relative to the ground or the canopy (e.g., for ideal spray application to a crop) is conducted based on the selected ground or canopy measured distances 1106, 1206. The control outlined in FIG. 8 and shown in various examples in FIGS. 9A-14B is conducted in an ongoing manner to accordingly automatically determine the reliability of ground and canopy measurements, compare confidences, and accordingly select the highest confidence (best) target and corresponding measured distances 1106, 1206 for control of the implement 102. The implement control module 404 is thereby configured to automatically shift the selected target and corresponding measured distances automatically while the vehicle 100 moves through a field to accordingly control the implement 102 with the highest reliability measurements.

In another example, configuration, for instance with an implement including multiple distance sensors 108, comparative confidence values are generated for each of the sensors (and optionally multiple confidence values for each sensor corresponding to ground and canopy comparative confidences). In this example, the target selection module 1300 compares each of these respective confidence values and according designates as the control basis one of the canopy or ground distance associated with one of the plural sensors 108. Further, as the target selection module 1300 updates the target selection 1410 (the control basis), the module 1300 accordingly chooses the canopy or ground distance having the highest associated comparative confidence across the plural sensors 108.

In still other examples the implement control module 404 conducts the assessments described herein (e.g., in FIGS. 9A-14B) for one or more components of the implement. For example, separate booms 106, different locations along a boom 106 or the implement 102 and their corresponding measured distances (e.g., measured by the sensors 108) are assessed for reliability and the targets selected based on the confidence comparisons. Optionally, a first boom 106 is controlled based on the ground measured distance 1106 while a second opposed boom 106 is controlled based on the canopy measured distance 1206 because of a higher canopy confidence relative to the ground confidence. In other examples, with booms 106 having multiple sensors 108, as shown in FIG. 4, the selected confidences of each of the sensors 108 including ground and canopy confidences for each are compared and the highest confidence between the multiple sensors is designated as the target selection 1410. Accordingly, the distance measurements from the corresponding sensor 108 are used as for control of the implement (e.g., relative to the selected canopy or ground) while the values from the other sensors 108 are ignored until the confidences change sufficiently to trigger reselection to a difference target, sensor or the like. In still other examples, the confidence differences 1304 from each of the sensors 108 are compared, and the largest (largest positive or least negative) value is chosen to select the appropriate sensor and its corresponding highest confidence target (ground or canopy).

Figure 15:
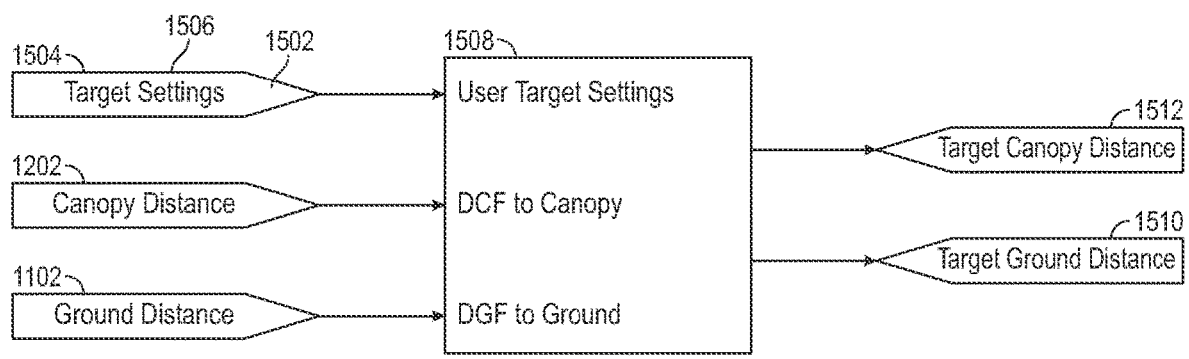
FIG. 15 is a schematic diagram of an example target and deviation module.

FIGS. 15-17 include example control architecture for the implement control module 404 for control of the one or more implements 102 of the vehicle 100. The example control architecture shown uses the target selection 1410 (see FIG. 14A) corresponding to the selection of either of a ground or canopy target and its corresponding ground or canopy measured distances 1106, 1206 to control the implement 102. For instance, the selected ground measured distance 1106 or canopy measured distance 1206 is used to determine the implement position relative to the target (ground or canopy) and control the implement, for instance with the implement actuator 406, to position the implement at a specified distance to the specified target, for instance by way of a feedback control loop. For instance, the operator sets a specified target 1504 as the 'canopy' (in contrast to 'ground'), and the specified distance to specified target 1506 is a distance, such as 20 inches. The specified target 1504 and the specified distance to specified target 1506 correspond to an operator chosen preference to position the implement 102, such as the boom 106, at 20 inches above the sensed canopy. In one example, the specified distance to specified target 1506 corresponds to an optimal application distance for an agricultural product sprayed from the booms 106. Deviation from the specified distance to specified target because of implement movement (e.g., because of terrain or crop height variation) is measured as canopy error. The canopy error is used with a feedback control loop to move the implement 102 with the implement actuator 406 to minimize the canopy error and accordingly achieve the specified distance to specified target 1506.

FIG. 15 provides one example of a schematic representation of a target distance submodule 1500 configured to receive the specified target 1504 and the specified distance to specified target 1506 as operator input preferences. The submodule additionally receives the measured distances from the sensor (or implement offset according to the position of the sensor) to each of the canopy and the ground. In one example, the distances provided to the target distance submodule 1508 corresponds to the distance to canopy filtered 1202 (e.g., 1202', DCF or the like) shown in FIGS. 12A, B and the distance to ground filtered 1102 (e.g., 1102', DGF or the like) shown in FIGS. 11, B. For instance, the distances correspond to actual measurements to the ground or canopy or previous values of the same based on the assessment at the example condition elements 1210, 1214 shown in FIGS. 12A, B.

The target distance submodule 1508 receives the inputs and generates target distances, for instance one or more of a target ground distance 1510 and a target canopy distance 1512. In an example including the operator input preferences 1502, such as the specified target 1504 (ST) and the specified distance to specified target 1506 (SDST) one of the target distances corresponds to the specified distance to target 1506. For instance, if the ST 1504 is the canopy and the SDST is 20 inches (e.g., an optimal application distance or the like) the target canopy distance 1512 corresponds to 20 inches, the input SDST. Conversely, if the ST 1504 is the ground the SDST is 60 inches the target ground distance 1510 is 60 inches.

The other target canopy distance, either of the target ground or target canopy distances 1510, 1512 not corresponding to the ST 1504 is determined by the target distance submodule 1508. As described herein, the determined target distance is a component for the determination of a corresponding ground or canopy target substitute 1610, 1612 (FIGS. 16A-18) that provides a substitute control for the implement 102 if the measured distance corresponding to the specified target 1504, such as distance to ground or canopy 1102, 1202, 'disappears'. For instance, if the specified target 1504 is the canopy (e.g., with a specified distance of 20 inches from the canopy) 'disappearance' of the canopy occurs in various examples including, but not limited to, merging of a canopy signal (canopy measurements) with the ground signal (ground measurements), irregularity in the canopy signal or the like that decreases the canopy confidence, such as the comparative canopy confidence 1244 (FIGS. 12C and 13), relative to the comparative ground confidence 1144 (FIGS. 11C and 13) to trigger control of the implement based on the distance to ground 1102 (including 1102'). Because control is switched in this example from canopy to ground (or conversely in another example from ground to canopy) the specified distance to specified target 1506 is not, by itself, an accurate target. For instance, if the previous canopy SDST 1506 of 20 inches was used after having shifted to control based on distance to ground 1102 the implement 102 would lower to achieve the 20 inch height and in some examples crash into the crop, ineffectively apply the agricultural product below the canopy or the like. Accordingly, a substitute target value is used with the substitute control scheme to minimize inaccurate positioning with changes in control schemes.

Figure 16A:
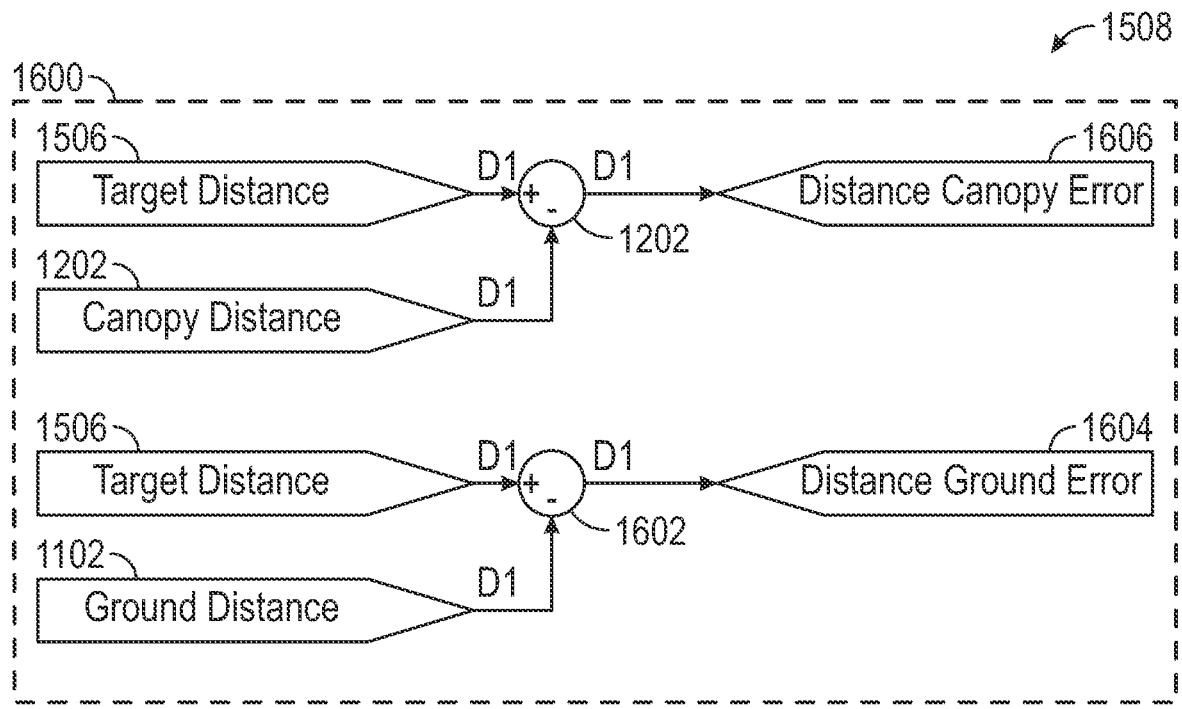
FIG. 16A is a schematic diagram of a portion of the target and deviation module of FIG. 15.

FIGS. 16A, B are example component submodules of the target distance submodule configured to determine control deviation from target values as well determine substitute target distances based on an input target distance, such as the specified distance to specified target 1506. Referring first to FIG. 16A, a target deviation submodule 1600 is configured to determine deviations of the implement position relative to the ST 1504 and the SDST 1506. For canopy error 1606 a comparator, such as a difference element 1602, receives the SDST 1506 and the distance to canopy filtered 1202 (including 1202' updated with either of the most recent measured distance 1206 or the previous filtered value 1202). In an example with the ST 1504 and the SDST 1506 corresponding to the canopy and a target distance relative to canopy, the canopy error 1606 corresponds to the deviation of the position of the implement 102, such as a boom 106, relative to the SDST. The difference element 1602 compares the SDST 1506 with the distance to canopy filtered 1202, and the output deviation or canopy error 1606 corresponds to the difference in position of the implement 102, such as the boom 106, relative to the canopy SDST 1506. The canopy error 1606 is readily used to control an actuator, such as the implement actuator 404, to guide the boom 106 toward the SDST.

In a similar manner, where the ST 1504 and SDST 1506 correspond to a ground target and a specified distance to ground (e.g., 40 inches, 60 inches or the like) ground error 1604 is determined through comparison of the ground SDST 1506 with the distance to ground filtered 1102 at the difference element 1602 in the lower portion of the target deviation submodule 1600. The deviation or ground error 1604 corresponds to the difference in position of the implement 102 relative to the ground SDST 1506.

Figure 16B:
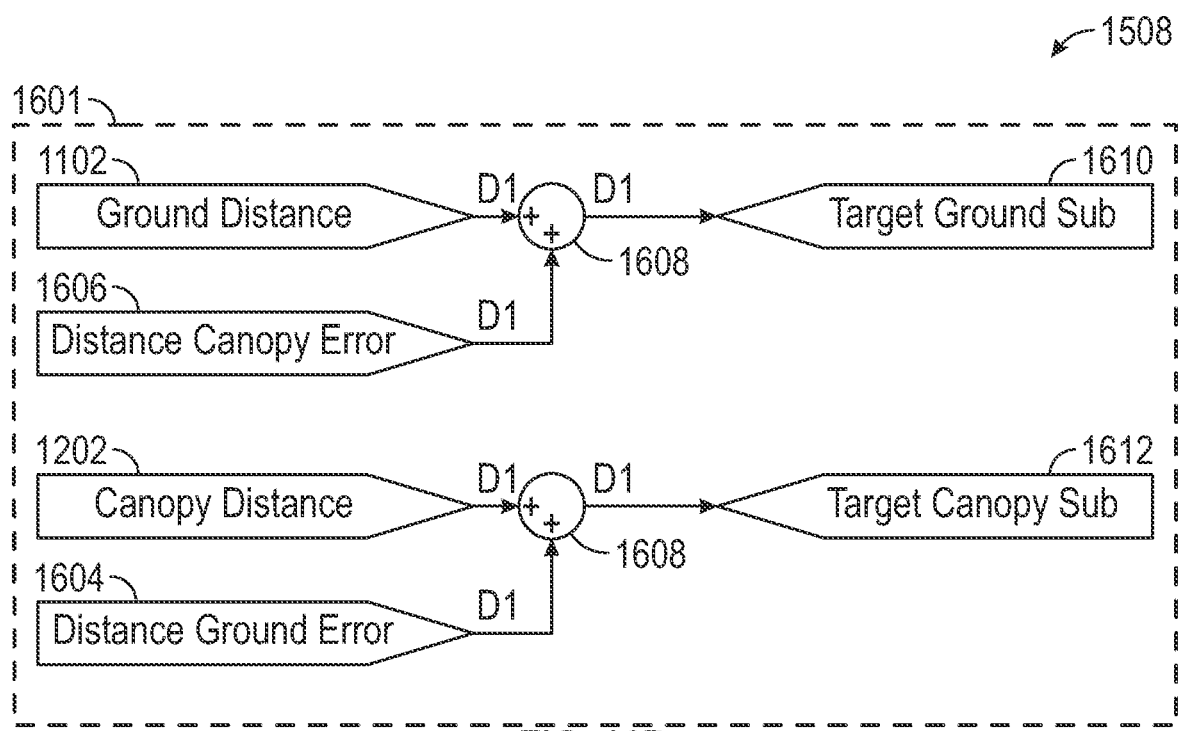
FIG. 16B is a schematic diagram of another portion of the target and deviation module of FIG. 15 with example substitute ground and canopy targets.

As previously described herein, in another example the distance measurement, for instance one of distance to canopy or distance to ground 1202, 1102, does not match the specified target 1506 and the corresponding specified distance to specified target 1506. For example, the comparative ground or canopy confidences 1144, 1244 trigger control with the other of the canopy or ground distances (1202, 1102). In this scenario the specified target 1504 and specified distance to specified target 1506 are different than the measured distance (e.g., the distance to canopy or distance to ground 1202, 1102), and the canopy or ground errors 1606, 1604 are not used (directly) for control of the implement because of the mismatch between the canopy or ground distance measurements 1202, 1102 and the ground or canopy ST 1504 and SDST 1506. Instead, the canopy or ground error 1606, 1604 in that instance is used to determine a canopy target substitute 1612 or ground target substitute 1610 as an alternative target relative to the ST 1504 and SDST 1506. FIGS. 16B, 17 and 18 show example determinations of the target canopy or target ground substitutes 1612, 1610.

Referring first to FIG. 16B, two examples are provided for determination of ground and canopy target substitutes 1610, 1612 (e.g., example substitute specified target distances) as part of a substitute target submodule 1601 of the target and deviation submodule 1508. In the first (upper) example a ground target substitute 1610 is determined where the specified target (ST or specified target designation) 1504 is 'canopy' and the specified distance to specified target (SDST or specified target distance to the specified target designation) 1506 is a specified target distance from the implement 102, such as a distance sensor 108 on a boom 106, to the canopy (e.g., an optimal application distance for a sprayed agricultural product of 20 inches). A summation element 1608 adds the canopy error 1606 from the target deviation submodule 1600 to the distance to ground filtered 1102 (DGF, including 1102' for measured distance or a previous, higher reliability, value). The resulting ground target substitute 1610 (e.g., a substitute specified target distance) corresponds to the summation. Because the ground target substitute 1610 includes the canopy SDST 1506 in the canopy error 1606, adjusted by the distance to ground filtered 1102, the ground target substitute 1610 accounts for the differing (canopy) specified target 1604 with a value (the canopy SDST) used with control based on the ground measurements. Accordingly, if the comparative canopy confidence 1244 decreases beneath the comparative ground confidence 1144 (thereby initiating a handoff from canopy to ground control) a corresponding ground target substitute 1610 is readily provided to facilitate the alternative control based on the ground measurements (e.g., distance to ground filtered 1102, 1102') while positioning the implement 102 (boom 106) proximate to the canopy SDST 1506. Crashing of the boom 106 into the crop or flying of the boom 106 above an optimal application distance are according avoided, and instead the implement readily and smoothly transitions from canopy based control to the substitute ground based control. Conversely, as the comparative canopy confidence 1244 increases relative to the comparative ground confidence 1144 the system returns to canopy based control of the implement using the canopy SDST and the canopy error 1606 shown in the upper portion of FIG. 16A.

In a converse scenario shown in the second (lower) example, a canopy target substitute 1612 (another example substitute specified target distance) is determined where the specified target (ST) 1504 is 'ground' and the specified distance to specified target (SDST) 1506 is a specified target distance from the implement 102 (e.g., distance sensor 108 on the implement) to the ground, such as 40 inches. A summation element 1608 adds the ground error 1604 from the target deviation submodule 1600 to the distance to canopy filtered 1202 (DCF, including 1202' for measured distance or a previous, higher reliability, value). The canopy target substitute 1612 corresponds to the summation. Because the canopy target substitute 1612 includes the ground SDST 1506 in the ground error 1604, adjusted by the distance to canopy filtered 1202, the canopy target substitute 1612 accounts for the differing (ground) specified target 1604 with a value (the ground SDST) used with control based on the canopy measurements. Accordingly, if the comparative ground confidence 1144 decreases beneath the comparative canopy confidence 1244 (thereby initiating a handoff from ground to canopy control) a corresponding canopy target substitute 1612 is readily provided to facilitate the alternative control based on the canopy measurements (e.g., distance to canopy filtered 1202, 1202') while positioning the implement 102 (boom 106) proximate to the ground SDST 1506. Flying of the boom 106 above an optimal application distance is accordingly avoided, and instead the implement readily and smoothly transitions from ground based control to the substitute canopy based control. Conversely, as the comparative ground confidence 1144 increases relative to the comparative canopy confidence 1244 the system returns to ground based control of the implement using the ground SDST and the ground error 1604 shown in the lower portion of FIG. 16A.

Figure 17A:
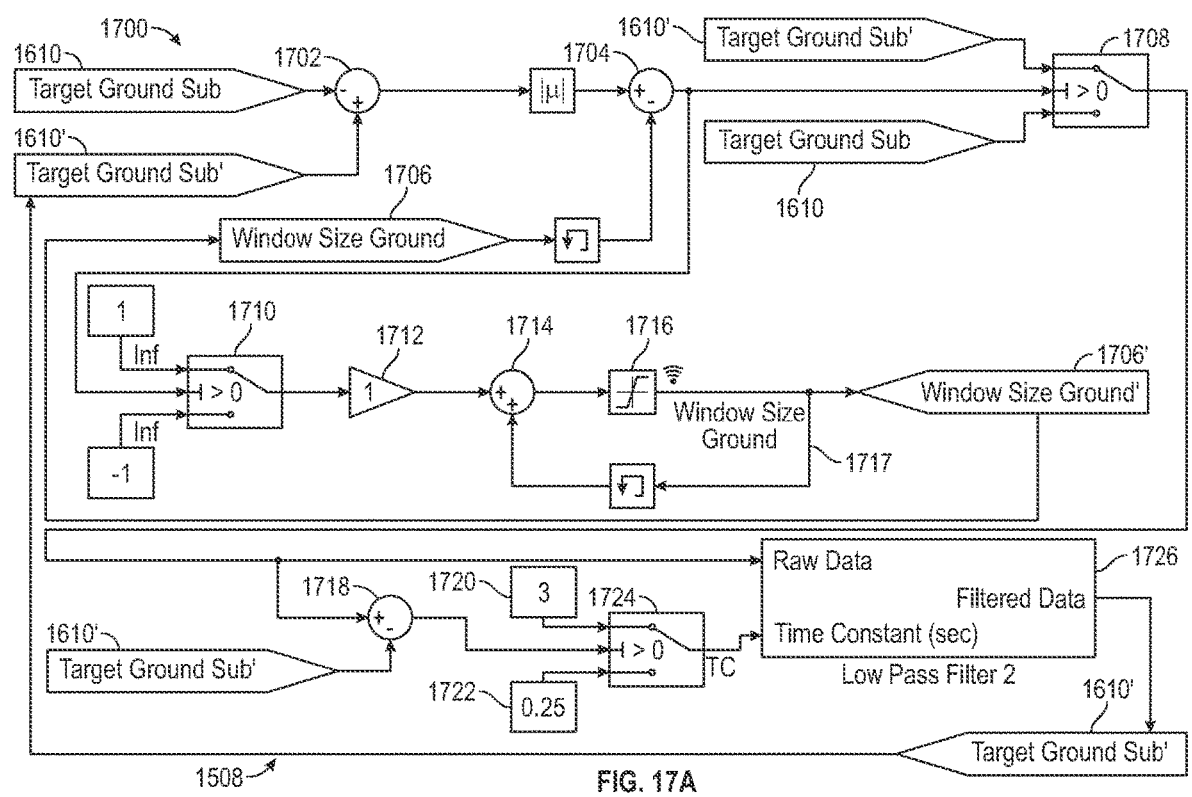
FIG. 17A is a schematic diagram of an example substitute ground target filter.
Figure 17B:
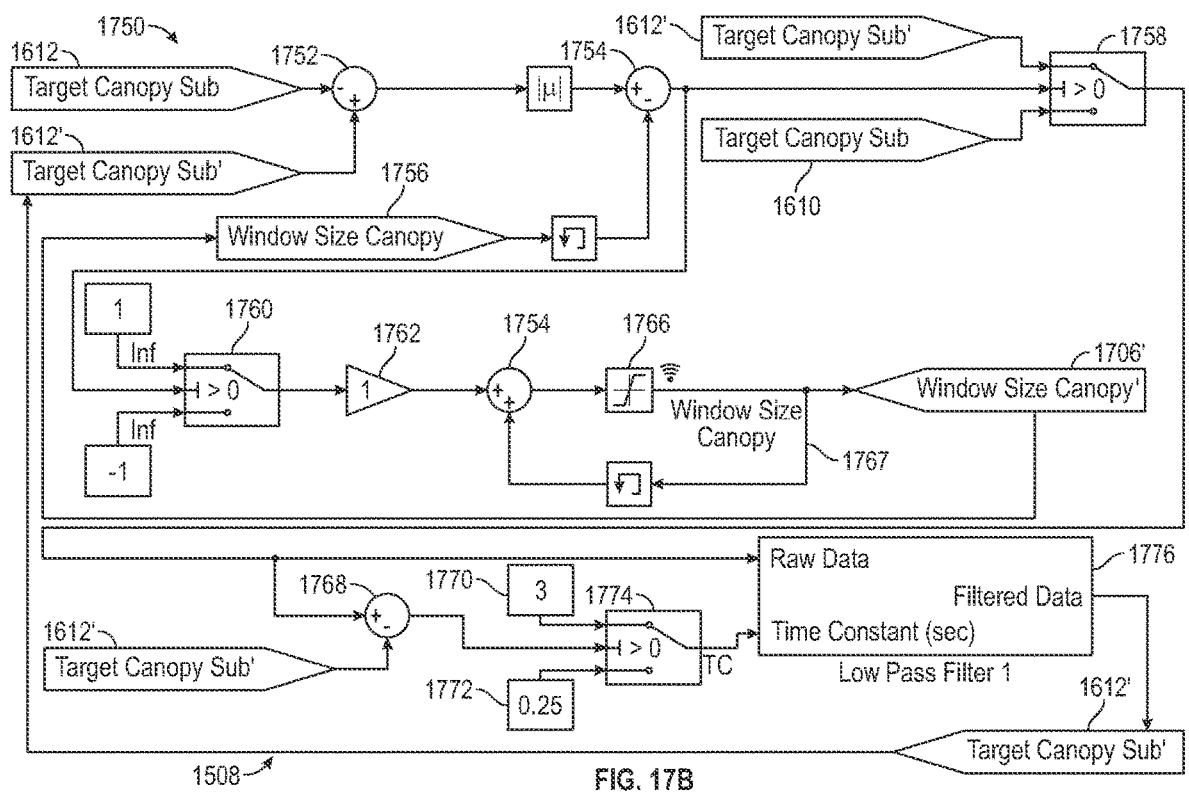
FIG. 17B is a schematic diagram of an example substitute canopy target filter.

FIGS. 17A, 17B are example filter modules for the ground and canopy target substitutes 1610, 1612 determined as shown in FIGS. 16A, B. As previously discussed the STSD 1506 is in one example a static value input by the operator, for instance as an optimal application distance, implement height or the like. In contrast, the ground and canopy target substitutes 1610, 1612 while based on the STSD are also based on the respective canopy error 1606 and ground error 1604. Each of the canopy error 1606 and ground error 1604 vary according to changes in their respective distance to ground 1102 (e.g., 1102', DGF) and distance to canopy (e.g., 1202', DCF). The target and deviation module 1508 includes the substitute ground target filter 1700 in FIG. 17A and the substitute canopy target filter 1750 in FIG. 17B to smooth the variation in the respective substitute target distances otherwise included with these values based on the respective canopy and ground errors 1606, 1604. Each of the filters 1700, 1750 operates in a similar manner to the previously described ground and canopy reliability modules 1100, 1200. For instance, an initial ground target substitute 1610 is compared with a previous or retained value of the substitute 1610' at the difference element 1702 (an example of a comparator).

The difference between these values is compared at the difference element 1704 with a corresponding ground window 1706. The ground window 1706 is generated in a similar manner to the previously described iterative expansion or contraction of with a window for the predictive windows used for reliability analysis. In this filtering example, the ground window 1706 has an initial range, and the initial range is iteratively expanded or contracted according to the condition element 1710, window gain 1712 and the corresponding repetition block and summation element 1714 having a saturation window to limit expansion or contraction of the ground window. The substitute ground window 1706' is returned for comparison with forthcoming differences between the ground target substitute 1610 and 1610' (a previous reliable value).

As further shown in FIG. 17A, after assessment with the ground window 1706 the ground target substitute 1610 or the previously retained value 1610' is selected and delivered to a low pass filter 1726 and corresponding spikes the value are isolated and removed. For instance the filter 1726 conducts filtering of the value according to a variable time constant. The variable time constant is determined with the updated value for the ground target substitute 1610 and the preceding value 1610' (if the updated value matches the preceding value the time constant is effectively zero and the value is not filtered and passes through. According to the difference between these values (e.g., determined with the difference element 1718) the time constant is modulated, for instance with first and second (optionally variable) filter values 1720, 1722. For example, if the difference is negative then the lower (and smaller) second filter value 1722 is used, and if the difference is positive then the upper (and larger) first filter value 1720 is used. The smaller second filter value 1722, in one example, corresponds to a decrease in the ground target substitute (e.g., an example substitute specified target distance) and is smaller to accordingly limit the decrease of the target distance to minimize the risk of collisions with the ground as the implement is guided to the lower target distance. Conversely an upward change of the ground target substitute (distance) in one example is preferred and accordingly the first filter value 1720 is larger and triggers more rapid filtering and change in the ground target substitute.

The value returned by the filter 1726, an updated ground target substitute 1610' is returned to the difference element 1702 for comparison with forthcoming values of the target ground substitute received from the summation element 1608 shown in FIG. 16.

In a similar manner, canopy target substitute 1612 evaluated and filtered with the substitute canopy target filter 1750. For example, the filter 1750 includes a comparison between the canopy target substitute 1612 and a previous value that has been filtered 1612'. The difference between these values is evaluated relative to a canopy window (and the canopy window is optionally modified as described for the ground window). The updated canopy target substitute received from the condition element 1758 is then filtered at the low pass filter 1776 in a similar manner to the low pass filter 1726 shown in FIG. 17A.

Various Notes and Aspects

Aspect 1 can include subject matter such as an automated implement control system for controlling movement of an agricultural implement comprising: one or more distance sensors configured for coupling with an agricultural implement, the one or more distance sensors each include: a ground sensing element configured to measure a ground distance from the one or more sensors to the ground; and a canopy sensing element configured to measure a canopy distance from the one or more sensors to a crop canopy; an implement control module in communication with the one or more distance sensors, the implement control module controls movement of the agricultural implement, and the implement control module includes: at least one confidence module configured to determine a ground confidence value based on the measured ground distance and a canopy confidence value based on the measured canopy distance; a target selection module configured to select one of the measured ground distance or the measured canopy distance as a control basis for controlling movement of the agricultural implement, the target selection module selection based on a comparison of the ground and canopy confidence values; and an actuator module configured to control movement of the agricultural implement according to the selected control basis.

Aspect 2 can include, or can optionally be combined with the subject matter of Aspect 1, to optionally include wherein the ground sensing element and the canopy sensing element are components of a unitary sensor.

Aspect 3 can include, or can optionally be combined with the subject matter of one or any combination of Aspects 1 or 2 to optionally include wherein the unitary sensor includes a radar instrument.

Aspect 4 can include, or can optionally be combined with the subject matter of one or any combination of Aspects 1-3 to optionally include wherein the ground sensing element and the canopy sensing element are separate components of the one or more distance sensors.

Aspect 5 can include, or can optionally be combined with the subject matter of one or any combination of Aspects 1-4 to optionally include the agricultural implement; and wherein the agricultural implement includes a sprayer boom.

Aspect 6 can include, or can optionally be combined with the subject matter of Aspects 1-5 to optionally include wherein the target selection module is configured to select the measured ground distance or the measured canopy distance according to the greater of the ground and canopy confidence values.

Aspect 7 can include, or can optionally be combined with the subject matter of Aspects 1-6 to optionally include wherein the confidence module includes: a predictive comparator configured to compare the measured ground or canopy distances to a predictive window corresponding to one or more of a predicted implement position or predicted change in implement position; and a confidence assignment element configured to: determine the ground confidence value according to the comparison of the measured ground distance to the predictive window; and determine the canopy confidence value according to the comparison of the measured canopy distance to the predictive window.

Aspect 8 can include, or can optionally be combined with the subject matter of Aspects 1-7 to optionally include wherein the one or more distance sensors are configured to provide a respective sensor confidence; and the confidence assignment element is configured to determine the ground confidence value and the canopy confidence value based on the sensor confidence.

Aspect 9 can include, or can optionally be combined with the subject matter of Aspects 1-8 to optionally include wherein the implement control module includes an implement prediction module configured to predict one or more of an implement position or change in implement position according to one or more kinematic inputs for the agricultural implement.

Aspect 10 can include, or can optionally be combined with the subject matter of Aspects 1-9 to optionally include wherein the kinematic inputs include one or more of implement angle, chassis roll rate of a vehicle chassis or implement rack angle of an implement rack between another component of the agricultural implement and the vehicle chassis.

Aspect 11 can include, or can optionally be combined with the subject matter of Aspects 1-10 to optionally include wherein the implement prediction module is configured to generate a predictive window corresponding to one or more of the predicted implement position or predicted change in implement position.

Aspect 12 can include, or can optionally be combined with the subject matter of Aspects 1-11 to optionally include wherein the one or more distance sensors includes a plurality of component distance sensors, the at least one confidence module includes a plurality of component confidence modules, wherein each of the component confidence modules is associated with a respective component distance sensor, and the component confidence module is configured to: determine the ground and canopy confidence values for the respective distance sensor; and the target selection module is configured to select one of the measured ground distances or the measured canopy distances of the plurality of component distance sensors as the control basis for controlling movement of the agricultural implement according to a comparison of the ground and canopy confidence values of the component confidence modules.

Aspect 13 can include, or can optionally be combined with the subject matter of Aspects 1-12 to optionally include wherein the target selection module is configured to select the measured ground distance or the measured canopy distance according to the greater of the corresponding ground and canopy confidence values of the component confidence modules.

Aspect 14 can include, or can optionally be combined with the subject matter of Aspects 1-13 to optionally include wherein the implement control module includes an actuator interface in communication with the actuator module, and the actuator interface is configured to couple the implement control module with the agricultural implement.

Aspect 15 can include, or can optionally be combined with the subject matter of Aspects 1-14 to optionally include wherein the implement control module includes an actuator module configured to control movement of the sprayer boom according to the control basis and a specified target distance to at least one of the ground or canopy, and the specified target distance corresponds to an operator preferred specified target.

Aspect 16 can include, or can optionally be combined with the subject matter of Aspects 1-15 to optionally include wherein the implement control module includes a substitute target module configured to determine a substitute specified target distance to the canopy or ground based on the specified target distance corresponding to the operator preferred specified target; and wherein the actuator module is configured to control movement of the sprayer boom according to the substitute specified target distance and an updated control basis different than the operator preferred specified target.

Aspect 17 can include, or can optionally be combined with the subject matter of Aspects 1-16 to optionally include an automated implement control system for controlling an implement position comprising: one or more distance sensors configured for coupling with an agricultural implement, the one or more distance sensors are configured to measure a ground distance to ground and a canopy distance to a crop canopy relative to the one or more distance sensors; an implement control module in communication with the one or more distance sensors, the implement control module includes: a target selection module configured to select one of ground distance or canopy distance as a control basis; and a target and deviation module configured to implement the selected ground distance or canopy distance as the control basis, the target and deviation module includes: an operator preference module having a specified target designation and a specified target distance relative to the specified target designation; a substitute target module configured to determine a substitute specified target distance if the control basis is different than the specified target designation; and a deviation module configured to determine deviation of an implement position based on the control basis and the specified target distance if the control basis corresponds to the specified target designation or the substitute specified target distance if the control basis is different than the specified target designation.

Aspect 18 can include, or can optionally be combined with the subject matter of Aspects 1-17 to optionally include wherein the one or more distance sensors include a radar instrument.

Aspect 19 can include, or can optionally be combined with the subject matter of Aspects 1-18 to optionally include the agricultural implement; and wherein the agricultural implement includes a sprayer boom.

Aspect 20 can include, or can optionally be combined with the subject matter of Aspects 1-19 to optionally include wherein the implement control module includes an actuator module configured to control implement position of the agricultural implement according to the determined deviation of the selected control basis from the corresponding specified target distance or substitute specified target distance.

Aspect 21 can include, or can optionally be combined with the subject matter of Aspects 1-20 to optionally include wherein the implement control module includes an actuator module configured to guide the implement position of the agricultural implement toward the specified target distance including: controlling the implement position according to the determined deviation based on the control basis and the specified target distance if the control basis corresponds to the specified target designation; and controlling the implement position according to the determined deviation based on the control basis and the substitute specified target distance if the control basis is different than the specified target designation.

Aspect 22 can include, or can optionally be combined with the subject matter of Aspects 1-21 to optionally include wherein the deviation module includes a comparator configured to determine the deviation of the agricultural implement as a difference of the measured ground or canopy distance as the control basis relative to one of the specified target distance or the substitute specified target distance.

Aspect 23 can include, or can optionally be combined with the subject matter of Aspects 1-22 to optionally include wherein the substitute target module includes a summation element configured to determine the substitute specified target distance based on the summation of: a preceding determined deviation of the control basis corresponding to the specified target relative to the specified target distance; and a proceeding ground or canopy distance of the control basis different than the specified target designation.

Aspect 24 can include, or can optionally be combined with the subject matter of Aspects 1-23 to optionally include wherein the implement control module includes a confidence module configured to determine a ground confidence value based on the measured ground distance and a canopy confidence value based on the measured canopy distance.

Aspect 25 can include, or can optionally be combined with the subject matter of Aspects 1-24 to optionally include wherein the target selection module includes a comparator configured to compare the ground and canopy confidence values; and the target selection module is configured to select one of the ground distance or the canopy distance as the control basis having the greater respective ground or canopy confidence value.

Aspect 26 can include, or can optionally be combined with the subject matter of Aspects 1-25 to optionally include wherein the confidence module includes: a predictive comparator configured to compare the measured ground or canopy distances to a predictive window corresponding to a predicted implement position or predicted change in implement position; and a confidence assignment element configured to: determine the ground confidence value according to the comparison of the measured ground distance to the predictive window; and determine the canopy confidence value according to the comparison of the measured canopy distance to the predictive window.

Aspect 27 can include, or can optionally be combined with the subject matter of Aspects 1-26 to optionally include wherein the one or more distance sensors provide a sensor confidence; and the confidence assignment element is configured to determine the ground confidence value and the canopy confidence value based on the sensor confidence.

Aspect 28 can include, or can optionally be combined with the subject matter of Aspects 1-27 to optionally include a method for controlling an implement position of an agricultural implement comprising: measuring a ground distance from one or more distance sensors to ground; measuring a canopy distance from the one or more distance sensors to a crop canopy; selecting a control basis for controlling movement of an agricultural implement, selecting includes: determining a ground confidence value based on the measured ground distance, and determining a canopy confidence value based on the measured canopy distance; comparing the ground and canopy confidence values; and assigning one of the ground distance or the canopy distance as the control basis according to the comparison; repeating selection of the control basis with ongoing measurements of ground and canopy distance; and controlling the implement position according to either of the ground distance or the canopy distance assigned as the control basis.

Aspect 29 can include, or can optionally be combined with the subject matter of Aspects 1-28 to optionally include wherein assigning one of the ground distance or the canopy distance as the control basis according to the comparison includes assigning the ground distance or the canopy distance as the control basis according to the greater of the ground and canopy confidence values.

Aspect 30 can include, or can optionally be combined with the subject matter of Aspects 1-29 to optionally include wherein determining the ground and canopy confidence values includes: comparing each of the ground distance and the canopy distance to a predictive window, the predictive window corresponding to one or more of a predicted implement position or predicted change in implement position; and establishing the ground confidence value according to the comparison of the ground distance to the predictive window; and establishing the canopy confidence value according to the comparison of the canopy distance to the predictive window.

Aspect 31 can include, or can optionally be combined with the subject matter of Aspects 1-30 to optionally include wherein establishing the ground confidence value includes establishing a greater ground confidence value if the ground distance is within the predictive window; and establishing the canopy confidence value includes establishing a greater canopy confidence value if the canopy distance is within the predictive window.

Aspect 32 can include, or can optionally be combined with the subject matter of Aspects 1-31 to optionally include wherein establishing the ground and canopy confidence values includes establishing the ground and canopy confidence values according to a sensor confidence provided by the one or more distance sensors.

Aspect 33 can include, or can optionally be combined with the subject matter of Aspects 1-32 to optionally include generating the predictive window with one or more kinematic inputs, generating the predictive window includes: determining a composite implement kinematic value based on the summation of the one or more kinematic inputs; determining the predictive window based on the composite implement kinematic value.

Aspect 34 can include, or can optionally be combined with the subject matter of Aspects 1-33 to optionally include wherein controlling the implement position according to either of the ground distance or the canopy distance assigned as the control basis includes: comparing the control basis to a specified target designation having an associated specified target distance; determining a substitute specified target distance if the control basis is different than the specified target designation; and assessing a deviation of the implement position, assessing the deviation includes: determining the deviation relative to the specified target distance and the control basis if the control basis corresponds with the specified target designation; and determining the deviation relative to the substitute specified target distance and the control basis if the control basis is different than the specified target designation; and guiding the implement position to minimize the determined deviation and move toward one of the specified target distance or the substitute specified target distance according to respective correspondence or difference of the control basis relative to the specified target designation.

Aspect 35 can include, or can optionally be combined with the subject matter of Aspects 1-34 to optionally include wherein guiding the implement position to minimize the determined deviation and move toward the substitute specified target distance with the control basis different than the specified target designation moves the implement position toward the specified target distance associated with the specified target designation.

Aspect 36 can include, or can optionally be combined with the subject matter of Aspects 1-35 to optionally include wherein determining the substitute specified target distance includes summing: a preceding determined deviation relative to the specified target distance and the control basis corresponding to the specified target designation; and a proceeding ground or canopy distance different than the specified target designation.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. An automated implement control system for controlling movement of a sprayer boom comprising:
    a sprayer boom extending between proximal and distal boom portions;
    a first distance sensor coupled with the sprayer boom proximate to the proximal boom portion, the first distance sensor configured to measure distances to one or more of a crop or ground proximate to the first distance sensor;
    a second distance sensor coupled with the sprayer boom distal to the first distance sensor, the second distance sensor configured to measure distances to one or more of the crop or ground proximate to the second distance sensor;
    at least one implement actuator coupled with the sprayer boom, the at least one implement actuator configured to control movement of the sprayer boom;
    a model analysis component configured to determine predicted distances to the ground or crop according to kinematic characteristics of the sprayer boom; and
    an implement control module in communication with the first and second distance sensors, the implement control module is configured to control movement of the sprayer boom, and the implement control module includes:
        at least one confidence module configured to determine confidence values based on the measured distances to the ground or crop;
        a control selection module configured to select the predicted distances to the ground or crop or the measured distances to the ground or crop as a control basis for controlling movement of the sprayer boom, the control selection module selection based on assessment of the of the confidence values of the measured distances to ground or crop; and
        an actuator module configured to control the at least one implement actuator and associated movement of the sprayer boom according to the selected control basis.

2. The automated implement control system of claim 1, wherein the second distance sensor is coupled with the sprayer boom proximate to the distal boom portion.

3. The automated implement control system of claim 2, wherein the at least one implement actuator is coupled with sprayer boom proximate to one of the first or second distance sensors.

4. The automated implement control system of claim 2, wherein the at least one confidence module is configured to determine confidence values of the measured distances to the ground or crop from each of the first and second distance sensors; and
    the control selection module is configured to select the predicted distances to the ground or crop or the measured distances to the ground or crop of the first and second sensors as the control basis for controlling movement of the sprayer boom.

5. The automated implement control system of claim 1, wherein at least one of the first or second distance sensors is configured to measure the ground distance and the crop distance.

6. The automated implement control system of claim 5, wherein the at least one confidence module is configured to determine the confidence values of each of the measured ground and crop distances.

7. The automated implement control system of claim 6, wherein the control selection module is configured to select one of the predicted distance, the measured ground distance or the measured crop distance as the control basis based on assessment of the confidence values of each of the measured ground and crop distances.

8. The automated implement control system of claim 1, wherein the control selection module assessment of the confidence value includes a comparator configured to compare the confidence value with a low confidence threshold.

9. The automated implement control system of claim 8, wherein the control selection module is configured to select the predicted distance as the control basis if the confidence value is below the low confidence threshold.

10. The automated implement control system of claim 1, wherein the at least one ground distance, crop distance or the predicted distance are determined to the ground or crop relative to the one or more distance sensors.

11. The automated implement control system of claim 1, wherein the model analysis component is configured to determine the predicted distances according to the kinematic characteristics including one or more of implement dimensions, implement orientation, vehicle dimensions, vehicle orientation, implement orientation rates of change, vehicle orientation rates of change, or one or more of the first or second distance sensor positions.

12. An automated implement control system for controlling movement of a sprayer boom comprising:
    a sprayer boom extending between proximal and distal boom portions;
    a first distance sensor coupled with the sprayer boom proximate to the proximal boom portion, the first distance sensor configured to measure distances to one or more of a crop or ground proximate to the first distance sensor;
    a second distance sensor coupled with the sprayer boom distal to the first distance sensor, the second distance sensor configured to measure distances to one or more of the crop or ground proximate to the second distance sensor;
    at least one implement actuator coupled with the sprayer boom, the at least one implement actuator configured to control movement of the sprayer boom;
    a implement prediction module configured to determine one or more predictive windows for measured distances based on kinematic characteristics of the sprayer boom; and
    an implement control module in communication with the first and second distance sensors, the implement control module is configured to control movement of the sprayer boom, and the implement control module includes:
        an assessment module configured to determine the measured distances to the ground or crop are within the one or more predictive windows;
        a control selection module configured to select predicted distances to the ground or crop or the measured distances to the ground or crop as a control basis for controlling movement of the sprayer boom, the control selection module selection based on determination of the measured distances within the one or more predictive windows; and
        an actuator module configured to control movement of the sprayer boom according to the selected control basis.

13. The automated implement control system of claim 12, wherein the second distance sensor is coupled with the sprayer boom proximate to the distal boom portion.

14. The automated implement control system of claim 12, wherein the at least one implement actuator is coupled with sprayer boom proximate to one of the first or second distance sensors.

15. The automated implement control system of claim 12, wherein the implement prediction module is configured to determine the one or more predictive windows based on predicted height changes for each of the first and second distance sensors.

16. The automated implement control system of claim 15, wherein the implement prediction module is configured to determine the predicted height changes based on an angular velocity of the sprayer boom.

17. The automated implement control system of claim 12, wherein the control selection module is configured to select the control basis is configured to index a greater reliability to the measured distances within the one or more predictive windows.

18. The automated implement control system of claim 12, wherein the control selection module is configured to select the control basis is configured to index a lesser reliability to the measured distances outside of the one or more predictive windows.

19. The automated implement control system of claim 12, wherein the implement prediction module is configured to determine the one or more predictive windows based on a reliability gain that varies inversely to the variability of terrain.

20. The automated implement control system of claim 19, wherein the variability of terrain includes rough terrain having a low reliability gain and consistent terrain having a high reliability gain.

21. The automated implement control system of claim 12, wherein at least one of the first or second distance sensors is configured to measure the ground distance and the crop distance.

22. The automated implement control system of claim 12, wherein the control selection module is configured to select the predicted distances to the ground or crop as the control basis if the measured distances are outside of the one or more predictive windows.

23. The automated implement control system of claim 12 comprising a model analysis component configured to determine the predicted distances to the ground or crop according to kinematic characteristics of the sprayer boom.

* * * * *